(12) United States Patent
Gazvoda et al.

(10) Patent No.: US 12,711,391 B2
(45) Date of Patent: Aug. 18, 2026

(54) METHOD AND SYSTEM FOR TRAINING A MODEL FOR RESOURCE DEPLOYMENT IN A DISTRIBUTED COMPUTE NETWORK

(71) Applicant: BunnyWay Informacijske storitve d.o.o, Ljubljana (SI)

(72) Inventors: Anton Zvonko Gazvoda, Ljubljana (SI); Nikiforos Pittaras, Ljubljana (SI)

(73) Assignee: BunnyWay Informacijske storitve d.o.o, Ljubljana (SI)

( * ) Notice: Subject to any disclaimer, the term of this patent is extended or adjusted under 35 U.S.C. 154(b) by 529 days.

(21) Appl. No.: 18/459,926

(22) Filed: Sep. 1, 2023

(65) Prior Publication Data

US 2025/0077883 A1 Mar. 6, 2025

(51) Int. Cl.
*G06N 3/092* (2023.01)

(52) U.S. Cl.
CPC .................................... *G06N 3/092* (2023.01)

(58) Field of Classification Search
CPC ......... G06N 3/092; G06N 3/006; G06N 20/00
See application file for complete search history.

(56) References Cited

U.S. PATENT DOCUMENTS 9,262,143 B2 * 2/2016 Karve ....................... G06F 8/60
10,320,610 B2 * 6/2019 Matni ................ H04L 41/0895
(Continued)

OTHER PUBLICATIONS

Zhang et al., "A-Sarsa: A Predictive Container Auto-Scaling Algorithm Based on Reinforcement Learning," 2020 IEEE International Conference on Web Services (2020).
(Continued)

*Primary Examiner* — John B King
(74) *Attorney, Agent, or Firm* — MEDLER FERRO WOODHOUSE & MILLS PLLC

(57) ABSTRACT

There is provided a computer-implemented method of reinforcement learning for training a machine learning model configured to provision and/or deprovision virtual application instances of an application in a distributed compute network having one or more compute nodes, the method being performed by at least one hardware processor and the method comprising: a) defining an action space for a training environment representative of the distributed compute network, the training environment having a plurality of states and, for each state, one or more available actions in the action space, each action being operable to transition the distributed compute network in the training environment from a current state to a new state; b) selecting one or more available actions in the action space to define a new state; c) determining a reward for the one or more selected actions based upon a predicted change in load characteristics for the distributed compute network in the training environment in moving from the current state to the new state, the predicted change in load characteristics being determined at least in part based on training data relating to the distributed compute network, wherein the training data comprising simulated load data relating to one or more parameters of one or more compute nodes; and d) training the machine learning model using the predicted change in load characteristics and the reward values to generate an updated trained machine learning model. nodes for provisioning of virtual application instances of the application.

14 Claims, 8 Drawing Sheets

(56) References Cited

U.S. PATENT DOCUMENTS

| | | | | |
|---|---|---|---|---|
| 11,894,983 | B2 * | 2/2024 | Malleni | H04L 43/20 |
| 12,237,979 | B2 * | 2/2025 | Niv | G06N 20/00 |
| 12,273,241 | B2 * | 4/2025 | Gazvoda | G06N 20/00 |
| 2013/0297802 | A1 * | 11/2013 | Laribi | H04L 12/6418 709/226 |
| 2015/0163162 | A1 * | 6/2015 | DeCusatis | H04L 47/803 709/224 |
| 2018/0034714 | A1 * | 2/2018 | Zhang | H04L 41/0895 |
| 2020/0370423 | A1 * | 11/2020 | Li | G06N 3/045 |
| 2022/0076159 | A1 * | 3/2022 | Owen | G06F 3/04847 |
| 2023/0123322 | A1 * | 4/2023 | Cella | G05B 13/048 700/29 |
| 2023/0297433 | A1 * | 9/2023 | Mishra | G06N 7/01 718/1 |
| 2023/0352179 | A1 * | 11/2023 | Neumann | G16B 40/00 |
| 2024/0251376 | A1 * | 7/2024 | Cheung | H04W 72/20 |
| 2025/0030759 | A1 * | 1/2025 | Bhatnagar | H04L 67/1008 |

OTHER PUBLICATIONS

Rossi et al., "Geo-distributed efficient deployment of containers with Kubernetes," Computer Communications 159: 161-174 (2020).

Lara Lorna Jiménez, "Decentralized Location-aware Orchestration of Containerized Microservice Applications," Doctoral Thesis, Lulea University of Technology, Department of Computer Science and Electrical Engineering, Retrieved from https://www.diva-portal.org/smash/get/diva2:1435575/FULLTEXT01.pdf (2020).

Ma et al., "Location-Aware Cloud Service Brokering in Multi-cloud Environment" In: Troya, J., et al. Service-Oriented Computing—ICSOC 2022 Workshops, Lecture Notes in Computer Science, vol. 13821, Retrieved from https./doi.org/10.1007/978-3-031-26507-5_42 (2022).

Knob et al., "Improving Container Deployment in Edge Computing Using the Infrastructure Aware Scheduling Algorithm," IEEE Symposium on Computers and Communications, Retrieved from https:/ieeexplore.ieee_org/document/9631490 (2021).

Kaur et al., "Live migration of containerized microservices between remote Kubernetes Clusters," INFOCOM Workshops, IEEE International Conference on Computer Communications, Retrieved from https://hal.science/hal-03466765/document (2023).

Santos et al., "gym-hpa: Efficient Auto-Scaling via Reinforcement Learning for Complex Microservice-based Applications in Kubernetes," NOMS 2023-2023 IEEE/IFIP Network Operations and Management Symposium, Retrieved from https://ieeexplore.ieee.org/document/10154298 (2023).

Pelle et al., "Cost and Latency Optimized Edge Computing Platform," Electronics 11(561):1-24 (2022).

Wang et al., "Container Scaling Strategy Based on Reinforcement Learning," Security and Communication Networks, 2023(7400235):1-10 (2023).

Daniel Edsinger, "Auto-scaling cloud infrastructure with Reinforcement Learning," Masters Thesis, Chalmers University of Technology, Department of Computer Science and Engineering, Retrieved from https://odr.chalmers.se/server/api/core/bitstreams/45c91134-43f8-4399-9a35-5f25b571bea9/content (2018).

Schuler et al., "AI-based Resource Allocation: Reinforcement Learning for Adaptive Auto-scaling in Serverless Environments," IEEE/ACM 21st International Symposium on Cluster, Cloud and Internet Computing (CCGrid), pp. 804-811 (2021).

Gari et al., "Reinforcement Learning-based Application Autoscaling in the Cloud: A Survey," arXiv:2001.09957, Retrieved from https://doi.org/10.48550/arXiv.2001.09957 (2021).

Xue et al., "A Meta Reinforcement Learning Approach for Predictive Autoscaling in the Cloud," arXiv:2205.15795v1, Retrieved from https://doi.org/10.48560/arXiv.2205_15795 (2022).

Cheng et al., "DRL-cloud: Deep reinforcement learning-based resource provisioning and task scheduling for cloud service providers," ASPDAC '18: Proceedings of the 23rd Asia and South Pacific Design Automation Conference, pp. 129-134, Retrieved from https://ieeexplore.ieee.org/document/8297294 (2018).

Xiao et al., "DScaler: A Horizontal Autoscaler of Microservice Based on Deep Reinforcement Learning," 23rd Asia-Pacific Network Operations and Management Symposium (APNOMS), pp. 1-6, Retrieved from https://ieeexplore.ieee.org/document/9919994 (2022).

* cited by examiner

METHOD AND SYSTEM FOR TRAINING A MODEL FOR RESOURCE DEPLOYMENT IN A DISTRIBUTED COMPUTE NETWORK

TECHNICAL FIELD

The present invention relates to a method and system for training a model for resource deployment in a distributed compute network. More particularly, the present invention relates to a method and system for training a machine learning model to provision/deprovision virtual resources in a distributed compute network in the form of an edge compute platform to improve performance and resource usage.

BACKGROUND

In modern data communications, user devices are connected by one or more backend applications to exchange and process data. Users often utilize distributed compute networks to facilitate deployment of data services and to handle computational workloads.

Distributed compute networks are network systems operated by companies or organizations to provide networked compute services and resources to customers. Distributed compute networks typically provide customers with services such as access to compute resources, application hosting resources, data storage resources and/or network resources, amongst others.

In general, distributed compute networks comprise or utilize a network of computing devices to enable provision of computing services to customers. A single server in a geographic location may be known as a compute node. Multiple servers can be grouped in networked clusters commonly known as a "data center". A data center may comprise a number of networked server devices collectively operable to provide compute services to users of the data center. It is common for the server devices to be located in a single geographical location (such as a single physical data center facility) although in certain circumstances the server devices may be more widely geographically located. A data center may also be referred to as a compute node. In other words, a compute node may comprise one or more physical compute servers located in a geographical region or specific geographical location.

To enable the computational resources of a data center to be more effectively utilized, virtualization techniques are often used. Virtualization techniques enable one or more physical server devices to host a multiplicity of virtual computing instances which can be utilized by users of the data center.

Each virtual computing instance appears to the users as an independently addressable computer system. However, the physical host server(s) can dynamically create, remove, manage, and modify each virtual computing instance in response to demand and load. In addition, the physical host server(s) can allocate specific virtual computing resources to users as required or to meet specific user requests for such resources.

One form of distributed compute network is an edge compute platform. An edge compute platform is designed to bring the compute resources closer to the end users with the goal of reducing the latency of data communication and the cost of data transmission. Edge compute platforms may comprise a plurality of geographically distributed data centers. These data centers may be connected by routing nodes or servers. Routing nodes are computing systems that direct data traffic to or from data centers in a network and are operable to monitor traffic.

The appropriate selection of data centers, including the number and type of virtualized resources provided by those data centers, and the routing of traffic to or from those data centers is critical to meeting the performance requirements (for example, a service level agreement (SLA)) demanded by end users of the edge compute platform).

However, finding an optimal solution to the usage of data centers, virtual computing resources and routing of data traffic in a complex network in order to meet user SLAs is a non-trivial problem. Thus, solutions to these technical problems are required.

BRIEF SUMMARY OF THE INVENTION

The following introduces a selection of concepts in a simplified form in order to provide a foundational understanding of some aspects of the present disclosure. The following is not an extensive overview of the disclosure and is not intended to identify key or critical elements of the disclosure or to delineate the scope of the disclosure. The following merely summarizes some of the concepts of the disclosure as a prelude to the more detailed description provided thereafter.

Disclosed herein are methods and systems (also referred to herein as "computer-implemented methods and systems) for performance optimization in a distributed compute network. In embodiments, disclosed herein are methods and systems (also referred to herein as "computer-implemented methods and systems") for dynamic application provisioning in edge compute platforms.

Several preferred aspects of the methods and systems according to the present invention are outlined below.

Aspect 1: A computer-implemented method of reinforcement learning for training a machine learning model configured to provision and/or deprovision virtual application instances of an application in a distributed compute network having one or more compute nodes, the method being performed by at least one hardware processor and the method comprising: a) defining an action space for a training environment representative of the distributed compute network, the training environment having a plurality of states and, for each state, one or more available actions in the action space, each action being operable to transition the distributed compute network in the training environment from a current state to a new state; b) selecting one or more available actions in the action space to define a new state; c) determining a reward for the one or more selected actions based upon a predicted change in load characteristics for the distributed compute network in the training environment in moving from the current state to the new state, the predicted change in load characteristics being determined at least in part based on training data relating to the distributed compute network, wherein the training data comprising simulated load data relating to one or more parameters of one or more compute nodes; and d) training the machine learning model using the predicted change in load characteristics and the reward values to generate an updated trained machine learning model.

Aspect 2: A computer-implemented method according to Aspect 1, further comprising: e) generating training data comprising simulated load data relating to one or more parameters of one or more compute nodes.

Aspect 3: A computer-implemented method according to Aspect 2, wherein step e) comprises generating training data by generating a time-series sequence of simulated values representative of one or more parameters of one or more compute nodes.

Aspect 4: A computer-implemented method according to Aspect 3, wherein the time-series sequence of simulated values have pre-defined ranges.

Aspect 5: A computer-implemented method according to Aspect 4, wherein the time-series sequence of simulated values for the one or more parameters of one or more compute nodes is generated using one or more mathematical functions.

Aspect 6: A computer-implemented method according to Aspect 5, wherein the one or more mathematical functions are selected from the group of: a constant function; a linear function; a quadratic function; and a polynomial function.

Aspect 7: A computer-implemented method according to any one of Aspects 1 to 6, wherein the one or more parameters are selected from one or more of: volume of requests per unit time; process count; memory footprint; number of virtualization containers; disk I/O; network and port usage; and percentage of CPU utilization for one or more servers of one or more compute nodes.

Aspect 8: A computer-implemented method according to any one of Aspects 1 to 7, wherein step c) comprises utilizing a load predictor model trained on the training data to predict the change in load distribution on the distributed compute network resulting from one or more actions in step b).

Aspect 9: A computer-implemented method according to Aspect 8, wherein, prior to step b), the method comprises: f) training the load predictor model on the training data.

Aspect 10: A computer-implemented method according to Aspect 8, wherein the load predictor model comprises a machine learning model.

Aspect 11: A computer-implemented method according to any one of Aspects 1 to 10, wherein the available actions in step b) comprise one or more of: provision one or more virtual application instances of an application on one or more compute nodes; deprovision one or more virtual application instances of an application on one or more compute nodes; and take no action.

Aspect 12: A computer-implemented method according to Aspect 11, wherein step c) is performed after the actions have been implemented in step b) to define the new state.

Aspect 13: A computer-implemented method according to any one of Aspects 1 to 12, wherein, subsequent to step c), the method further comprises: g) determining whether a reward target has been met and, if so, progressing to step d).

Aspect 14: A computer-implemented method according to Aspect 13, wherein, if the reward target is not met at step f), the method further comprises: h) iteratively repeating steps b) and c) until the reward target is met.

Aspect 15: A computer-implemented method of provisioning resources in a distributed compute network comprising one or more routing nodes and one or more compute nodes configured to host one or more virtual application instances of an application thereon, the method being performed by at least one hardware processor and comprising: a) receiving, by a system manager, resource load data relating to the computational loads resulting from one or more virtual application instances running on one or more compute nodes corresponding to a current state of the distributed compute network; b) determining, by the system manager, whether the values of the resource load data corresponding to the current state of the distributed compute network fall outside one or more predetermined target ranges for the resource load data and, if so determined, performing the step of: c) dynamically performing, utilizing a trained machine learning model, provisioning of virtual application instances and/or deprovisioning of virtual application instances on one or more compute nodes to generate a new state of the distributed computing network, wherein the trained machine learning model is trained by a training method utilizing simulated load data relating to one or more parameters of one or more compute nodes.

Aspect 16: A computer-implemented method according to Aspect 15, wherein the simulated load data is generated from a time-series sequence of simulated values representative of one or more parameters of one or more compute nodes.

Aspect 17: A computer-implemented method according to Aspect 16, wherein the time-series sequence of simulated values have pre-defined ranges.

Aspect 18: A computer-implemented method according to Aspect 17, wherein the time-series sequence of simulated values for the one or more parameters of one or more compute nodes is generated using one or more mathematical functions.

Aspect 19: A computer-implemented method according to Aspect 18, wherein the one or more mathematical functions are selected from the group of: a constant function; a linear function; a quadratic function; and a polynomial function.

Aspect 20: A computer-implemented method according to any one of Aspects 15 to 19, wherein the one or more parameters are selected from one or more of: volume of requests per unit time; process count; memory footprint; number of virtualization containers; disk I/O; network and port usage; and percentage of CPU utilization for one or more servers of one or more compute nodes.

Aspect 21: A computer-implemented method according to any one of Aspects 15 to 20, wherein the trained machine learning model is trained using a load predictor model trained on the training data to predict the change in load distribution on the distributed compute network resulting from simulated provisioning and/or deprovisioning of virtual application instances of an application.

Aspect 22: A computer-implemented method of reinforcement learning for training a machine learning model configured to provision virtual application instances of an application in a distributed compute network having one or more compute nodes, the method being performed by at least one hardware processor and the method comprising: a) generating training data relating to the distributed compute network, wherein said training data comprises simulated load data relating to one or more parameters of one or more compute nodes; b) defining an action space for a training environment representative of the distributed compute network, the training environment having a plurality of states and, for each state, one or more available actions in the action space, each action being operable to transition the distributed compute network in the training environment from a current state to a new state; c) selecting one or more available actions in the action space to define a new state; d) determining a reward for the one or more selected actions based upon a predicted change in load characteristics for the distributed compute network in the training environment in moving from the current state to the new state, a value of the reward being at least in part a function of the simulated load data comprising the training data; and e) training the machine learning model using the training data and the reward values to generate an updated trained machine learning model.

Aspect A1: A computer-implemented method of provisioning resources in a distributed compute network comprising one or more routing nodes and one or more compute nodes configured to host one or more virtual application instances of an application thereon, the method being performed by at least one hardware processor and comprising: receiving, by a system manager, operational parameter data for each available routing node for a current state of the distributed compute network, wherein the operational parameter data comprises measured and/or predicted values of a local latency between a respective routing node and any available compute nodes accessible by the respective routing node; determining, by the system manager, an optimized global latency value for the current state of the distributed compute network based on the received operational parameter data; defining a latency threshold for a global latency for the application based on the optimized global latency value; generating, utilizing a trained machine learning model, a proposed new state of the distributed compute network having a global latency for the application which meets or exceeds the latency threshold; and implementing the proposed new state on the distributed compute network by selecting and/or deselecting one or more compute nodes for provisioning of virtual application instances of the application.

Aspect A2: A computer-implemented method according to Aspect A1, wherein the global latency of the application is a function of the local latencies of any provisioned virtual application instances.

Aspect A3: A computer-implemented method according to Aspect A1 or A2, wherein the optimized global latency value is a function of the local latency values for each available routing node between a respective routing node and an available compute node accessible by the respective routing node having a lowest local latency value.

Aspect A4: A computer-implemented method according to Aspect A3, wherein the optimized global latency value comprises an averaged sum of the local latency values for each available routing node between a respective routing node and the available compute node accessible by the respective routing node having the lowest latency.

Aspect A5: A computer-implemented method according to Aspect A1, A2 or A3, wherein step c) further comprises defining one or more further latency thresholds for the global latency for the application based on the optimized global latency value.

Aspect A6: A computer-implemented method according to any one of Aspects A1 to A5, wherein the trained machine learning model is trained using reinforcement-learning.

Aspect A7: A computer-implemented method according to any one of Aspects A1 to A6, wherein step c) further comprises: proposing one or more actions to the current state to generate a proposed new state, the one or more actions comprising selecting and/or deselecting one or more compute nodes for provisioning of virtual application instances of the application; determining whether the global latency of the proposed new state meets or exceeds the latency threshold and, if so determined, implementing the proposed new state at step e).

Aspect A8: A computer-implemented method according to Aspect A7, wherein if, at step g) the global latency of the proposed new state does not meet or exceed the latency threshold, the method further comprises: Iteratively repeating steps f) and g) until the latency threshold is met.

Aspect A9: A system for provisioning resources in a distributed compute network comprising one or more routing nodes and one or more compute nodes configured to host one or more virtual application instances of an application thereon, the system comprising: at least one hardware processor operable to perform the steps of: receiving, by a system manager, operational parameter data for each available routing node for a current state of the distributed compute network, wherein the operational parameter data comprises measured and/or predicted values of a local latency between a respective routing node and any available compute nodes accessible by the respective routing node; determining, by the system manager, an optimized global latency value for the current state of the distributed compute network based on the received operational parameter data; defining a latency threshold for a global latency for the application based on the optimized global latency value; generating, utilizing a trained machine learning model, a proposed new state of the distributed compute network having a global latency for the application which meets or exceeds the latency threshold; and implementing the proposed new state on the distributed compute network by selecting and/or deselecting one or more compute nodes for provisioning of virtual application instances of the application.

Aspect A10: A system according to Aspect A9, wherein the global latency of the application is a function of the local latencies of any provisioned virtual application instances.

Aspect A11: A system according to Aspect A9 or A10, wherein the optimized global latency value is a function of the local latency values for each available routing node between a respective routing node and an available compute node accessible by the respective routing node having a lowest local latency value.

Aspect A12: A system according to Aspect A11, wherein the optimized global latency value comprises an averaged sum of the local latency values for each available routing node between a respective routing node and the available compute node accessible by the respective routing node having the lowest latency.

Aspect A13: A system according to any one of Aspects A9 to A12, wherein step c) further comprises defining one or more further latency thresholds for the global latency for the application based on the optimized global latency value.

Aspect A14: A system according to any one of Aspects A9 to A13, wherein the trained machine learning model is trained using reinforcement-learning.

Aspect A15: A system according to any one of Aspects A9 to A14, wherein step c) further comprises: proposing one or more actions to the current state to generate a proposed new state, the one or more actions comprising selecting and/or deselecting one or more compute nodes for provisioning of virtual application instances of the application; determining whether the global latency of the proposed new state meets or exceeds the latency threshold and, if so determined, implementing the proposed new state at step e).

Aspect A16: A system according to Aspect A15, wherein if, at step g) the global latency of the proposed new state does not meet or exceed the latency threshold, the method further comprises: Iteratively repeating steps f) and g) until the latency threshold is met.

Aspect A17: A non-transitory computer readable storage medium storing a program of instructions executable by a machine to perform a computer-implemented method of provisioning resources in a distributed compute network comprising one or more routing nodes and one or more compute nodes configured to host one or more virtual application instances of an application thereon, the method comprising: receiving, by a system manager, operational parameter data for each available routing node for a current state of the distributed compute network, wherein the operational parameter data comprises measured and/or predicted values of a local latency between a respective routing node and any available compute nodes accessible by the respective routing node; determining, by the system manager, an optimized global latency value for the current state of the distributed compute network based on the received operational parameter data; defining a latency threshold for a global latency for the application based on the optimized global latency value; generating, utilizing a trained machine learning model, a proposed new state of the distributed compute network having a global latency for the application which meets or exceeds the latency threshold; and implementing the proposed new state on the distributed compute network by selecting and/or deselecting one or more compute nodes for provisioning of virtual application instances of the application.

Aspect A18: A non-transitory computer readable storage medium according to Aspect A17, wherein the optimized global latency value is a function of the local latency values for each available routing node between a respective routing node and an available compute node accessible by the respective routing node having a lowest local latency value.

Aspect A19: A non-transitory computer readable storage medium according to Aspect A18, wherein the optimized global latency value comprises an averaged sum of the local latency values for each available routing node between a respective routing node and the available compute node accessible by the respective routing node having the lowest latency.

Aspect A20: A method of reinforcement learning for training a machine learning model configured to provision resources in a distributed compute network having one or more compute nodes and one or more routing nodes, the method being performed by at least one hardware processor and the method comprising: generating training data relating to the distributed compute network, wherein said training data comprises operational parameter data for each available routing node for a current state of the distributed compute network, wherein the operational parameter data comprises measured and/or predicted values of a local latency between a respective routing node and any available compute nodes accessible by the respective routing node; defining an action space for a training environment representative of the distributed compute network, the training environment having a plurality of states and, for each state, one or more available actions in the action space, each action being operable to transition the distributed compute network in the training environment from a current state to a new state; determining a reward value for a selected action based upon a change in global latency for the application on the distributed compute network in the training environment in moving from the current state to the new state; and training the machine learning model using the training data and the reward values.

Aspect B1: A computer-implemented method of provisioning resources in a distributed compute network comprising one or more routing nodes and one or more compute nodes configured to host one or more virtual application instances of an application thereon, the method being performed by at least one hardware processor and comprising: a) receiving, by a system manager, routing operational parameter data from one or more routing nodes and compute operational parameter data from one or more compute nodes for a current state of the distributed compute network; b) generating a proposed new state of the distributed compute network by utilizing the routing operational parameter data and compute operational parameter data in a computational model to simulate provisioning and/or deprovisioning of virtual application instances associated with one or more compute nodes; c) implementing the proposed new state on the distributed compute network by provisioning and/or deprovisioning one or more virtual application instances of the application on one or more compute nodes on the distributed computing network to define a new state of the distributed computing network.

Aspect B2: A computer-implemented method according to Aspect B1, wherein the computational model comprises a trained machine learning model.

Aspect B3: A computer-implemented method according to Aspect B2, wherein the computational model is trained using reinforcement-learning.

Aspect B4: A computer-implemented method according to Aspect B1, wherein the routing operational parameter data comprises measured and/or predicted values of a local latency between a respective routing node and any available compute nodes accessible by the respective routing node.

Aspect B5: A computer-implemented method according to Aspect B4, wherein the compute operational parameter data comprises resource load data relating to the computational load on one or more virtual application instances running on one or more compute nodes of the distributed compute network.

Aspect B6: A computer-implemented method according to Aspect B5, wherein step b) further comprises: d) generating the proposed new state of the distributed compute network having a global latency for the application which meets or exceeds a global latency threshold, the global latency of the application comprising a function of the local latencies of any provisioned virtual application instances.

Aspect B7: A computer-implemented method according to Aspect B6, wherein step d) further comprises: e) generating the proposed new state of the distributed compute network in which one or more virtual application instances have a computational load within a target range.

Aspect B8: A computer-implemented method according to Aspect B7, wherein step c) further comprises: f) proposing one or more actions to the current state to generate the proposed new state, the one or more actions comprising provisioning and/or deprovisioning virtual application instances of the application on one or more compute nodes; and g) determining whether i) the global latency for the application meets or exceeds a global latency threshold and ii) one or more virtual application instances have a computational load within the target range and, if both i) and ii) are so determined, proceeding to step c).

Aspect B9: A computer-implemented method according to Aspect B8, wherein if, at step g) the global latency of the proposed new state does not meet or exceed the latency threshold, the method further comprises: h) Iteratively repeating steps f) and g) until criteria i) and ii) are both met.

Aspect B10: A computer-implemented method according to Aspect B7, wherein the target range has an upper threshold and a lower threshold.

Aspect B11: A system for provisioning resources in a distributed compute network comprising one or more routing nodes and one or more compute nodes configured to host one or more virtual application instances of an application thereon, the system comprising: at least one hardware processor operable to perform the steps of: a) receiving, by a system manager, routing operational parameter data from one or more routing nodes and compute operational parameter data from one or more compute nodes for a current state of the distributed compute network; b) generating a proposed new state of the distributed compute network by utilizing the routing operational parameter data and compute operational parameter data in a computational model to simulate provisioning and/or deprovisioning of virtual application instances associated with one or more compute nodes; c) implementing the proposed new state on the distributed compute network by provisioning and/or deprovisioning one or more virtual application instances of the application on one or more compute nodes on the distributed computing network to define a new state of the distributed computing network.

Aspect B12: A system according to Aspect B11, wherein the computational model comprises a trained machine learning model.

Aspect B13: A system according to Aspect B12, wherein the computational model is trained using reinforcement-learning.

Aspect B 14: A system according to Aspect B11, wherein the routing operational parameter data comprises measured and/or predicted values of a local latency between a respective routing node and any available compute nodes accessible by the respective routing node.

Aspect B15: A system according to Aspect B14, wherein the compute operational parameter data comprises resource load data relating to the computational load on one or more virtual application instances running on one or more compute nodes of the distributed compute network.

Aspect B16: A system according to Aspect B15, wherein step b) further comprises: d) generating the proposed new state of the distributed compute network having a global latency for the application which meets or exceeds a global latency threshold, the global latency of the application comprising a function of the local latencies of any provisioned virtual application instances.

Aspect B17: A system according to Aspect B16, wherein step d) further comprises: e) generating the proposed new state of the distributed compute network in which one or more virtual application instances have a computational load within a target range.

Aspect B18: A system according to Aspect B17, wherein step c) further comprises: f) proposing one or more actions to the current state to generate the proposed new state, the one or more actions comprising provisioning and/or deprovisioning virtual application instances of the application on one or more compute nodes; and g) determining whether i) the global latency for the application meets or exceeds a global latency threshold and ii) one or more virtual application instances have a computational load within the target range and, if both i) and ii) are so determined, proceeding to step d).

Aspect B19: A system according to Aspect B18, wherein if, at step g) the global latency of the proposed new state does not meet or exceed the latency threshold, the method further comprises: Iteratively repeating steps f) and g) until criteria i) and ii) are both met.

Aspect B20: A non-transitory computer readable storage medium storing a program of instructions executable by a machine to perform a computer-implemented method of provisioning resources in a distributed compute network comprising one or more routing nodes and one or more compute nodes configured to host one or more virtual application instances of an application thereon, the method comprising: a) receiving, by a system manager, routing operational parameter data from one or more routing nodes and compute operational parameter data from one or more compute nodes for a current state of the distributed compute network; b) generating a proposed new state of the distributed compute network by utilizing the routing operational parameter data and compute operational parameter data in a computational model to simulate provisioning and/or deprovisioning of virtual application instances associated with one or more compute nodes; c) implementing the proposed new state on the distributed compute network by provisioning and/or deprovisioning one or more virtual application instances of the application on one or more compute nodes on the distributed computing network to define a new state of the distributed computing network.

Aspect B21: A computer-implemented method of provisioning network resources in a distributed compute network having one or more compute nodes and one or more routing nodes, the method being performed by at least one hardware processor and comprising: receiving, by a system manager, latency data relating to a current state of the distributed compute network, wherein the latency data comprises measured and/or predicted local latency values for each routing node, the local latency values corresponding to the measured and/or predicted latency between an available routing node and each available compute node accessible by the routing node; receiving, by a system manager, resource load data relating to the computational loads resulting from one or more application instances running on one or more compute nodes of the distributed compute network corresponding to a current state of the distributed compute network; utilizing a trained machine learning model to generate a proposed new state of the distributed compute network by simulating provisioning and/or deprovisioning of virtual application instances associated with one or more compute nodes to define a new proposed state of the distributed computing network; implementing the proposed new state on the distributed compute network by provisioning and/or deprovisioning of one or more compute nodes and/or one or more application instances on the distributed compute network to define the new state of the distributed compute network.

Aspect C1: A computer-implemented method of provisioning resources in a distributed compute network comprising one or more routing nodes and one or more compute nodes configured to host one or more virtual application instances of an application thereon, the method being performed by at least one hardware processor and comprising: a) receiving, by a system manager, routing operational parameter data from one or more routing nodes and compute operational parameter data from one or more compute nodes for a current state of the distributed compute network; b) generating a first proposed state of the distributed compute network by utilizing the routing operational parameter data in a first model to simulate selection and/or deselection of one or more compute nodes for provisioning of virtual application instances of the application; c) generating a second proposed state of the distributed computing network by utilizing the compute operational parameter data in a second model to provision and/or deprovision virtual application instances of the application on the compute nodes selected in the first proposed state; and c) implementing the second proposed state on the distributed compute network by provisioning and/or deprovisioning one or more virtual application instances of the application on one or more compute nodes on the distributed computing network to define a new state of the distributed computing network.

Aspect C2: A computer-implemented method according to Aspect C1, wherein the first model comprises a trained machine learning model.

Aspect C3: A computer-implemented method according to Aspect C2, wherein the first model is trained using reinforcement-learning.

Aspect C4: A computer-implemented method according to Aspect C1, wherein the second model comprises a trained machine learning model.

Aspect C5: A computer-implemented method according to Aspect C4, wherein the second model is trained using reinforcement-learning.

Aspect C6: A computer-implemented method according to Aspect C1, wherein the routing operational parameter data comprises measured and/or predicted values of a local latency between a respective routing node and any available compute nodes accessible by the respective routing node.

Aspect C7: A computer-implemented method according to Aspect C6, wherein step b) further comprises: e) generating a first proposed state of the distributed compute network having a global latency for the application which meets or exceeds a global latency threshold, the global latency of the application comprising a function of the local latencies of any provisioned virtual application instances.

Aspect C8: A computer-implemented method according to Aspect C7, wherein step b) further comprises: g) proposing one or more actions to the current state to generate the first proposed state, the one or more actions comprising selecting and/or deselecting one or more compute nodes for provisioning of virtual application instances of the application; h) determining whether the global latency of the first proposed state meets or exceeds the latency threshold and, if so determined, proceeding to step c).

Aspect C9: A computer-implemented method according to Aspect C9, wherein if, at step h) the global latency of the first proposed state does not meet or exceed the latency threshold, the method further comprises: Iteratively repeating steps g) and h) until the latency threshold is met.

Aspect C10: A computer-implemented method according to Aspect C1, wherein the compute operational parameter data comprises resource load data relating to the computational load on one or more virtual application instances running on one or more compute nodes of the distributed compute network.

Aspect C11: A computer-implemented method according to Aspect C10, wherein step c) further comprises: j) generating a second proposed state of the distributed compute network in which one or more virtual application instances have a computational load within a target range.

Aspect C12: A computer-implemented method according to Aspect C11, wherein the target range has an upper threshold and a lower threshold.

Aspect C13: A computer-implemented method according to Aspect C11, wherein step c) further comprises: k) proposing one or more actions to the first proposed state to generate the second proposed state, the one or more actions comprising provisioning and/or deprovisioning virtual application instances of the application on one or more compute nodes; and j) determining whether one or more virtual application instances have a computational load within the target range and, if so determined, proceeding to step d).

Aspect C14: A system for provisioning resources in a distributed compute network comprising one or more routing nodes and one or more compute nodes configured to host one or more virtual application instances of an application thereon, the system comprising: at least one hardware processor operable to perform the steps of: a) receiving, by a system manager, routing operational parameter data from one or more routing nodes and compute operational parameter data from one or more compute nodes for a current state of the distributed compute network, b) generating a first proposed state of the distributed compute network by utilizing the routing operational parameter data in a first model to simulate selection and/or deselection of one or more compute nodes for provisioning of virtual application instances of the application; c) generating a second proposed state of the distributed computing network by utilizing the compute operational parameter data in a second model to provision and/or deprovision virtual application instances of the application on the compute nodes selected in the first proposed state; and d) implementing the second proposed state on the distributed compute network by provisioning and/or deprovisioning one or more virtual application instances of the application on one or more compute nodes on the distributed computing network to define a new state of the distributed computing network.

Aspect C15: A system according to Aspect C14, wherein the first model and/or second model comprises a trained machine learning model.

Aspect C16: A system according to Aspect C14, wherein the routing operational parameter data comprises measured and/or predicted values of a local latency between a respective routing node and any available compute nodes accessible by the respective routing node.

Aspect C17: A system according to Aspect C16, wherein step b) further comprises: e) generating a first proposed state of the distributed compute network having a global latency for the application which meets or exceeds a global latency threshold, the global latency of the application comprising a function of the local latencies of any provisioned virtual application instances.

Aspect C18: A system according to Aspect C17, wherein step b) further comprises: g) proposing one or more actions to the current state to generate the first proposed state, the one or more actions comprising selecting and/or deselecting one or more compute nodes for provisioning of virtual application instances of the application; h) determining whether the global latency of the first proposed state meets or exceeds the latency threshold and, if so determined, proceeding to step c).

Aspect C19: A system according to Aspect C14, wherein the compute operational parameter data comprises resource load data relating to the computational load on one or more virtual application instances running on one or more compute nodes of the distributed compute network.

A system according to Aspect C19, wherein step c) further comprises: j) generating a second proposed state of the distributed compute network in which one or more virtual application instances have a computational load within a target range.

Aspect C21: A non-transitory computer readable storage medium storing a program of instructions executable by a machine to perform a computer-implemented method of provisioning resources in a distributed compute network comprising one or more routing nodes and one or more compute nodes configured to host one or more virtual application instances of an application thereon, the method comprising: a) receiving, by a system manager, routing operational parameter data from one or more routing nodes and compute operational parameter data from one or more compute nodes for a current state of the distributed compute network, b) a first proposed state of the distributed compute network by utilizing the routing operational parameter data in a first model to simulate selection and/or deselection of one or more compute nodes for provisioning of virtual application instances of the application; c) generating a second proposed state of the distributed computing network by utilizing the compute operational parameter data in a second model to provision and/or deprovision virtual application instances of the application on the compute nodes selected in the first proposed state; and d) implementing the second proposed state on the distributed compute network by provisioning and/or deprovisioning one or more virtual application instances of the application on one or more compute nodes on the distributed computing network to define a new state of the distributed computing network.

Aspect C22: A computer-implemented method of provisioning network resources in a distributed compute network having one or more compute nodes and one or more routing nodes, the method being performed by at least one hardware processor and comprising: receiving, by a system manager, latency data relating to a current state of the distributed compute network, wherein the latency data comprises measured and/or predicted local latency values for each routing node, the local latency values corresponding to the measured and/or predicted latency between an available routing node and each available compute node accessible by the routing node; receiving, by a system manager, resource load data relating to the computational loads resulting from one or more application instances running on one or more compute nodes of the distributed compute network corresponding to a current state of the distributed compute network; utilizing a first trained machine learning model to generate a proposed new state of the distributed compute network by simulating provisioning and/or deprovisioning of one or more compute nodes to define a new proposed state of the distributed computing network; utilizing a second trained machine learning model, to provision and/or deprovision application instances on the compute nodes of the first proposed state to generate a second proposed state of the distributed computing network; and implementing the proposed new state on the distributed compute network by provisioning and/or deprovisioning of one or more compute nodes and/or one or more application instances on the distributed computing network to define the new state of the distributed computing network.

Aspect D1: A computer-implemented method of provisioning network resources in a distributed compute network having one or more compute nodes and one or more routing nodes, the method being performed by at least one hardware processor and comprising: receiving, by a system manager, latency data relating to a current state of the distributed compute network, wherein the latency data comprises measured and/or predicted local latency values for each routing node, the local latency values corresponding to the measured and/or predicted latency between an available routing node and each available compute node accessible by the routing node; receiving, by a system manager, resource load data relating to the computational loads resulting from one or more application instances running on one or more compute nodes of the distributed compute network corresponding to a current state of the distributed compute network; utilizing a first trained machine learning model to generate a proposed new state of the distributed compute network by simulating provisioning and/or deprovisioning of one or more compute nodes to define a new proposed state of the distributed computing network; utilizing a second trained machine learning model, to provision and/or deprovision application instances on the compute nodes of the first proposed state to generate a second proposed state of the distributed computing network; and implementing the proposed new state on the distributed compute network by provisioning and/or deprovisioning of one or more compute nodes and/or one or more application instances on the distributed computing network to define the new state of the distributed computing network.

Aspect D2: A method of reinforcement learning for training a machine learning model configured to provision virtual application instances of an application in a distributed compute network having one or more compute nodes, the method being performed by at least one hardware processor and comprising the method comprising: generating training data relating to the distributed compute network, wherein said training data comprises synthetic load data relating to one or more parameters of one or more compute nodes; defining an action space for a training environment representative of the distributed compute network, the training environment having a plurality of states and, for each state, one or more available actions in the action space, each action being operable to transition the distributed compute network in the training environment from a current state to a new state; determining a reward for the selected action based upon a change in load characteristics for the distributed compute network in the training environment in moving from the current state to the new state, a value of the reward being at least in part a function of the synthetic load data forming the training data; and training the machine learning model using the training data and the reward values.

Aspect D3: A computer-implemented method of provisioning network resources in a distributed compute network having one or more compute nodes and one or more routing nodes, the method being performed by at least one hardware processor and comprising: receiving, by a system manager, resource load data relating to the computational loads resulting from one or more application instances running on one or more compute nodes of the distributed compute network corresponding to a current state of the distributed compute network; determining, by the network application provisioner, whether the values of the resource load data corresponding to the current state of the distributed compute network fall outside one or more predetermined target ranges for the resource load data and, if so determined, performing the step of: dynamically performing, utilizing a trained machine learning model, provisioning of application instances and/or deprovisioning of application instances on one or more compute nodes to generate a new state of the distributed computing network, wherein the trained machine learning model is trained on synthetic data representative of simulated load data.

Aspect D4: A computer-implemented method of provisioning network resources in a distributed compute network having one or more compute nodes and one or more routing nodes, the method being performed by at least one hardware processor and comprising: receiving, by a system manager, latency data relating to a current state of the distributed compute network, wherein the latency data comprises measured and/or predicted local latency values for each routing node, the local latency values corresponding to the measured and/or predicted latency between an available routing node and each available compute node accessible by the routing node; receiving, by a system manager, resource load data relating to the computational loads resulting from one or more application instances running on one or more compute nodes of the distributed compute network corresponding to a current state of the distributed compute network; utilizing a trained machine learning model to generate a proposed new state of the distributed compute network by simulating provisioning and/or deprovisioning of virtual application instances associated with one or more compute nodes to define a new proposed state of the distributed computing network; implementing the proposed new state on the distributed compute network by provisioning and/or deprovisioning of one or more compute nodes and/or one or more application instances on the distributed compute network to define the new state of the distributed compute network.

BRIEF DESCRIPTION OF THE DRAWINGS

Embodiments of the present invention will now be described by example only and with reference to the figures in which.

Figure 1A:
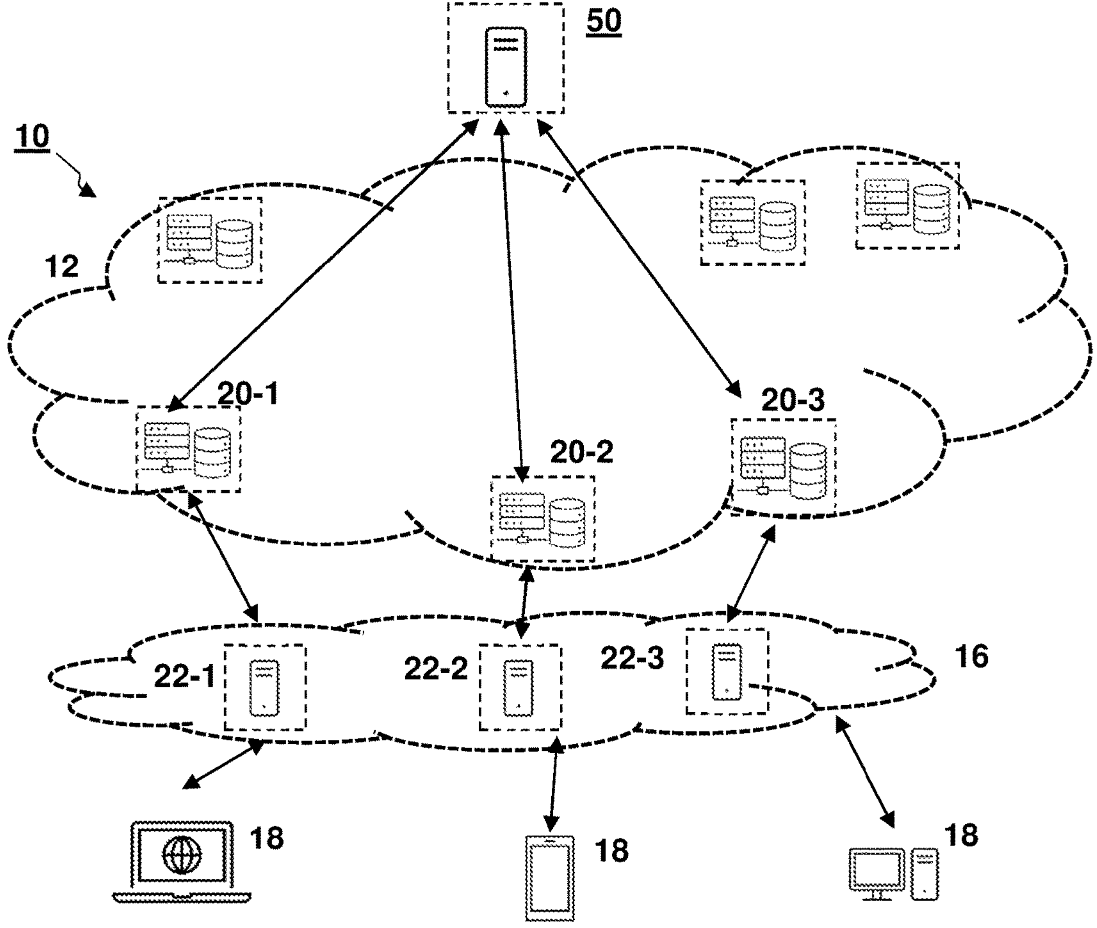
FIG. 1A is a schematic diagram of a distributed compute network in the form of an edge compute platform according to an embodiment.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

The technology described herein provides technical improvements to the existing distributed compute network field. Technical improvements provide a computer-implemented method of reinforcement learning for training a machine learning model configured to provision and/or deprovision virtual application instances of an application in a distributed compute network having one or more compute nodes.

An action space is defined for a training environment representative of the distributed compute network, the training environment having a plurality of states and, for each state, one or more available actions in the action space, each action being operable to transition the distributed compute network in the training environment from a current state to a new state. Then, one or more available actions in the action space are selected to define a new state. A reward is then determined for the one or more selected actions based upon a predicted change in load characteristics for the distributed compute network in the training environment in moving from the current state to the new state.

The predicted change in load characteristics is determined at least in part based on training data relating to the distributed compute network, the training data comprising simulated load data relating to one or more parameters of one or more compute nodes. The machine learning model is then trained using the predicted change in load characteristics and the reward values to generate an updated trained machine learning model.

By using simulated or synthetic load data, a machine learning model can be trained quickly without the need to obtain extensive and sufficient real-world data. This means that improvements in network performance can be provided quickly. Accordingly, systems and methods described herein provide an improvement to the functionality of a distributed compute network.

In particular, the present technology described herein assists in enabling the load balancing in the network to achieve an acceptable level in a significantly reduced timescale when compared to traditional training scenarios based on machine learning. This provides benefits to an end user in terms of performance whilst minimizing compute resources and so lowering the cost of operation, which may result in lower costs for the end user.

General Configuration of Edge Compute Platform

An edge compute platform is a distributed compute network arranged to provide and deliver computational resources as close as possible to IoT or computer devices of end users (which may include one or more of users, customers or subscribers).

In embodiments, an edge compute platform provides various computational services, such as central processing unit (CPU)-based compute, or graphical processing unit (GPU)-based compute, etc. In examples, aspects of an edge compute platform may be specialized for particular processing (e.g. artificial intelligence (AI) algorithms, etc.)

An edge compute platform environment comprises a set of processes which are run across a plurality of geographically distributed computer systems connected via a network. The computer systems exchange data across the network to carry out processes such as performing computational tasks.

The computer systems can be broadly categorised in to two groups—one or more compute nodes that process requests from client devices, and one or more routing nodes that direct traffic between compute nodes.

An exemplary arrangement of a distributed compute network in the form of an edge compute platform 10 is shown in FIG. 1A. The edge compute platform 10 is intended to illustrate the general configuration of such a distributed compute network, and numerous other computational, topographical and structural arrangements of network elements are also possible within the scope of the present invention.

The edge compute platform 10 comprises a distributed network 12 which may include network components of one or more networked environments. The distributed network 12 facilitates connectivity between the components of the network system 10. The distributed network may utilize any suitable protocol; for example, Transmission Control Protocol and Internet Protocol (TCP/IP). In embodiments, the network may utilize anycast IP routing. Anycast IP routing is an addressing scheme enabling a plurality of servers to share the same IP address. This enables a plurality of physical destination servers to be logically identified using a single IP address.

In embodiments, the distributed network 12 may comprise a single network and/or a proprietary network. Alternatively, the distributed network 12 may include multiple networks including wide area networks (WAN), local area networks (LAN), or other cloud networks. A central proprietary data management network may also be provided for communication between proprietary components of the edge compute platform 10.

The distributed network 12 is operative connected to one or more routing networks 16 which provide access to one or more user devices 18. The routing network 16 may take any suitable form which provides access to the distributed network 12 to the user devices 18.

In use, a user device 18 requests content via the routing network 16 which provides the request to the distributed network 12. The requested content is then sent to the user device 18 through the distributed network 12 and routing network 16.

Note that whilst for clarity of function the distributed network 12 and routing network 16 are shown as discrete entities, this need not be the case and, in embodiments, the distributed network 12 and routing network 16 may comprise a single distributed network operable to provide services to user devices 18.

The user devices 18 may comprise any suitable computing device, including, but not limited to, a personal computer, laptop, mobile device ("smartphone") or tablet.

The user devices 18 may interact with the edge compute platform 10 through one or more user interfaces such as a website, application, or application programming interface (API). The interface(s) may be part of, or serve as a front-end to, a control plane of the distributed network 12 that enables access to specific services for the user devices 18.

In this context, the data communication between the user devices 18 and the edge compute platform 10 may, in embodiments, be solely through an application running on or otherwise available to the user devices 18 and which is hosted on the edge compute platform 10.

"Content" may include, in non-limiting examples, include video media, image files, audio files, multimedia content, text, documents, software applications, and other electronic content.

Network Node Configuration

The edge compute platform 10 comprises a plurality of geographically-distributed compute nodes 20 and routing nodes 22. Compute nodes 20 comprise computational resources for carrying out computational tasks such as virtualization (for example, virtual machine instances), accessing or generating content resources, deploying application programs and carrying out any other data processing or management.

Compute nodes 20 may, in non-limiting embodiments, generally be considered to correspond to a physical compute server or a cluster of physical compute servers such as a data center. In other words, compute nodes 20 may comprise one or more physical compute server devices having a defined physical and geographical location (i.e. the geographical location of the physical compute server (if a compute node 20 corresponds to a single server) or the data center (if multiple physical compute servers) forming the respective compute node 20). In embodiments, different compute nodes 20 are geographically spaced from one another and have different physical and geographical locations in one or more geographical regions.

The edge compute platform 10 may comprise any suitable number of compute nodes 20-1, 20-2, 20-3, **20-*n* communicatively coupled via the distributed network 12. Each compute node 20-1, 20-2, 20-3, 20-*n*** may comprise pre-installed or installable resources to enable hosting of applications.

Routing nodes 22 operate within one or more routing networks 16 and are operable to direct user traffic data to compute nodes 20. These may comprise individual or groups of servers operable to route application data and/or application instances to/from particular compute nodes 20. Routing nodes 22 may, in embodiments, comprise part of one or more Internet Service Provider (ISP) infrastructure(s).

Compute Node Virtualisation Examples

Virtualization enables physical hardware resources to be utilized efficiently by abstracting elements of the physical infrastructure. Virtualization technologies virtualizes the server hardware of the compute nodes 20-1, 20-2, 20-3, **20-*n*** into discrete virtual computing instances. Common examples of virtual computing instances are virtual machines (VMs) or containers. These schemes enable multi-tenancy, allowing the same physical hardware to execute multiple workloads as if running on separate hardware.

VMs and containers are two different but complementary virtualization technologies. A VM runs a host operating system (OS), application workloads, and any software libraries. A VM image may be very large with a size of the order of tens of GB. VMs are isolated and can run different OS images on the same server.

In contrast, containers are an OS-level virtualization, which abstracts an application from the computational infrastructure enabling container workloads to be handled independently of the underlying hardware. A container instance (or image) is a standalone executable software product which packages an application and its required components. In embodiments, a container-based virtualization uses a standard system format. One such example is Docker.

Virtualization can be employed on compute nodes 20-1, 20-2, 20-3, **20-*n* to enable distributed network structures such as edge computing to be carried out. In edge computing, applications or processes are executed at the edge, on the edge compute platform 10 close to user devices 18** in terms of latency and/or geography to improve the quality of service delivered to users.

In embodiments, any suitable type of virtualization may be used as appropriate in order to deploy one or more applications on the edge compute platform 10.

Figure 1B:
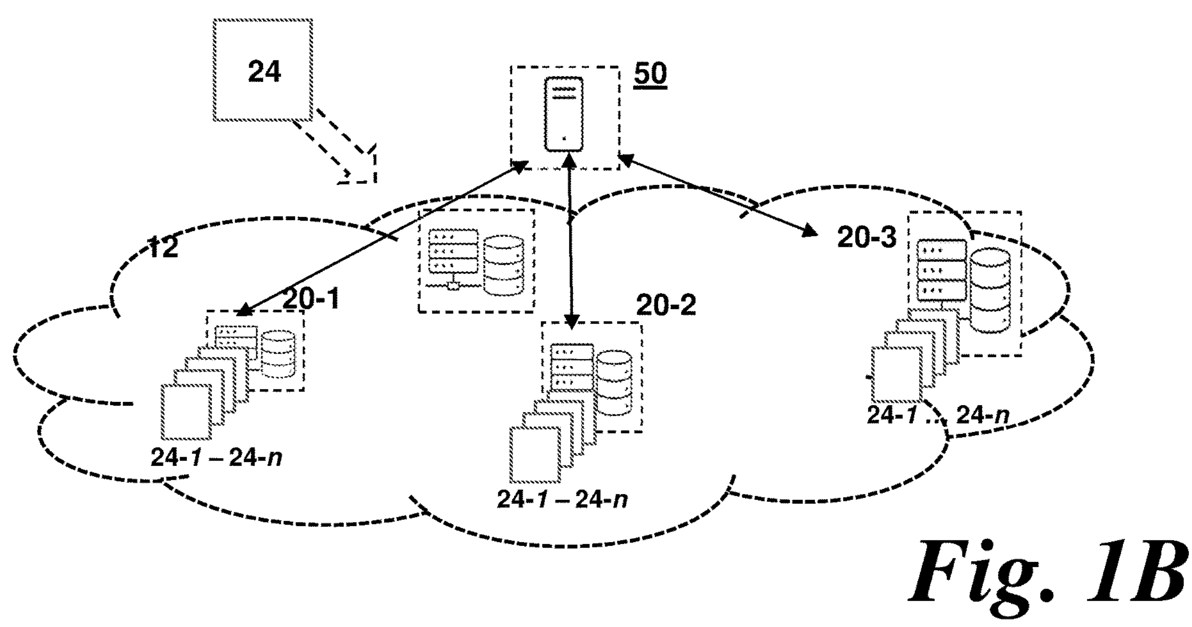
FIG. 1B is a schematic diagram showing virtual application instances deployed on the edge compute platform of FIG. 1A.

FIG. 1B shows a schematic example of an application 24 deployed on the edge compute platform 10. As shown, a plurality of compute nodes 20-1, 20-2, 20-3, **20-*n* each host one or more virtual application instances 24-1 . . . 24-*n* of an application 24**.

Note that any suitable number of virtual application instances 24-1 . . . **24-*n* may be hosted by any compute node 20. Thus n may range from 0 (i.e. no virtual application instances 24**-*n* of the application 24 on a given compute node 20) to k, where k is the maximum number of virtual application instances 24-*n* that can be supported on that compute node 20. Also note that n need not be the same for each compute node 20 and the number of virtual application instances 24-*n* on any one compute node 20 can be independent from the number of virtual application instances 24-*n* on any other compute node 20.

In order to manage the virtual application instances 24-*n* and compute nodes 20 on an edge compute platform 10, an orchestrator 50 (FIGS. 1A and 1B) is utilized. An orchestrator 50 is operable to provision or deprovision virtual application instances 24-1 . . . 24-*n* (which may, in embodiments, take the form of containers or VMs for those virtual application instances 24-*n*) on one or more compute nodes 20 in specific regions in order to meet quality of service requirements or other end user demands.

It will be understood that by "provision" it is meant that a virtual application instance 24-*n* is created or spawned on a particular compute node 20. It will be understood that by "deprovision" it is meant that a virtual application instance 24-*n* is removed or destroyed on a particular compute node 20.

When a virtual application instance 24-*n* is provisioned or deprovisioned, this creates a new state of the edge compute platform 10. It will be understood that "state" is intended to refer to a particular configuration of one or more virtual application instances 24-*n* running on one or more compute nodes 20 at a particular time instance.

In embodiments, the orchestrator 50 forms part of a system manager 100 for dynamically maintaining the edge compute platform 10.

Whilst the above exemplary embodiments show and describe a single orchestrator 50, this need not be the case. For example, multiple application instances or replicas of the orchestrator 50 may be created as required in the distributed system. The number of orchestrators 50 may be scaled in dependence upon the number of compute nodes 20 and/or number of virtual application instances on those nodes 20.

In embodiments, an orchestrator 50 may be deployed for each compute node 20 to control the provisioning or deprovisioning of virtual application instances 24-*n* on each node 20. In alternative embodiments, an orchestrator 50 may be deployed for control of multiple nodes 20 as required.

System Manager Overview—First Embodiment

Figure 2:
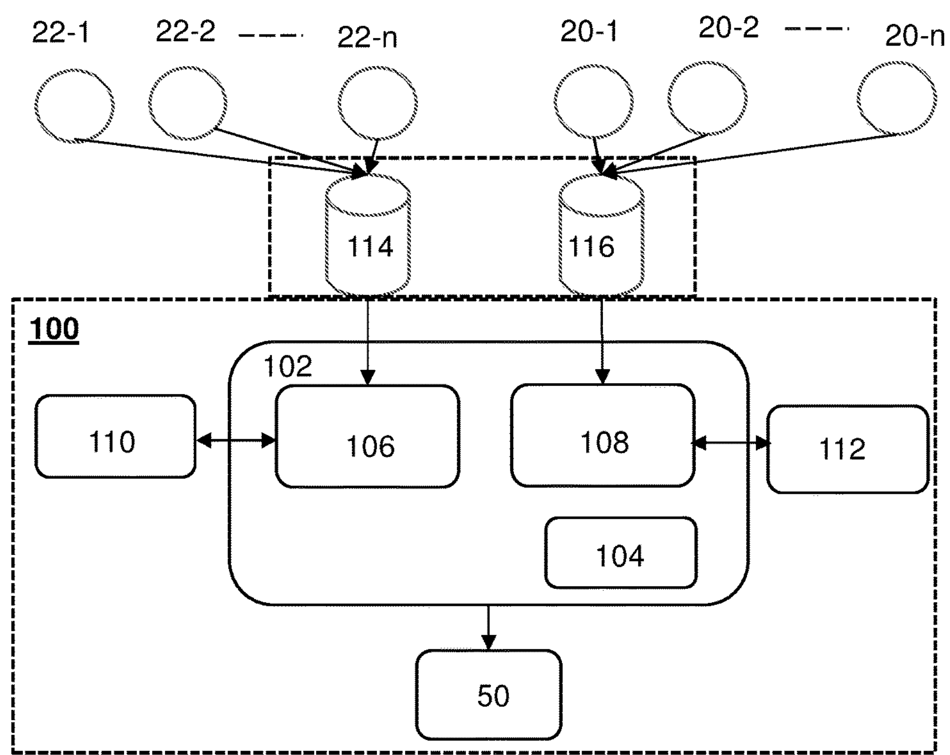
FIG. 2 is a schematic diagram of a system manager 100 according to a first embodiment of the present invention.

FIG. 2 shows a schematic diagram of the system manager 100 according to a first embodiment. Whilst a single system manager 100 is shown and described for clarity, this need not be the case and multiple system managers may be provisioned as required.

The system manager 100 comprises the orchestrator 50 (which, in embodiments, may comprise multiple orchestrator instances) and an application provisioner 102. The application provisioner 102 is executed on a hardware system having at least one physical processor 104.

The application provisioner 102 comprises a latency optimizer module 106 and an auto-scaler module 108. Each of modules 106, 108 comprise one or more trained machine learning algorithms. Each of the modules 106, 108 focuses on optimizing a different element of the edge compute platform 10 and generate updated states for the edge compute platform 10. The updated states are then implemented by the orchestrator 50.

In other words, the orchestrator 50 applies and updates the application state by provisioning/deprovisioning the compute nodes 20 and scaling of the application instances (containers) on those compute nodes 20 according to an optimal state derived by the application provisioner 102.

The application provisioner 102 is operatively connected to machine learning training modules 110, 112. Machine learning training modules 110, 112 enable the modules 106, 108 to be trained and refined based on real-world and/or simulated data from the edge compute platform 10 to optimize decision making by the modules 106, 108. Module 110 is operable to train the latency optimizer module 106 and machine learning module 112 is operable to train the auto-scaler module 108.

The application provisioner 102 is operatively connected to data stores 114, 116. Data store 114 is operable to obtain operational parameter data from the routing nodes 22-1, 22-2, 22-*n*. In embodiments, the operational parameter data from the routing nodes 22-1, 22-2, 22-*n* may include, but is not limited to, latency data and requests or packets count data from one or more routing nodes 22-1, 22-2, 22-*n*.

In embodiments, latency data corresponds to the measured or estimated latency between a routing node 22 and one or more compute nodes 20. In embodiments, the latency data comprises the measured or estimated latency between each routing node 22 and all available compute nodes 20. The latency between a routing node 22 and a compute node 20 is a "local latency" and has a local latency value. This is usually expressed in units of time, for example ms. Each routing node 22 may be in data communication with a plurality of separate compute nodes 20 and so may have a plurality of local latency values for that routing node 22.

In embodiments, this information is determined such that, for a routing node 22 in the edge compute platform 10, the measured and/or estimated local latency between that routing node 22 and all available compute nodes 20 is known. Note that in this context of each routing node 22 to determine local latencies "all available" compute nodes 20 may be considered to refer to all compute nodes 20 available and accessible by the respective routing node 22. This may, in embodiments, correspond to all available compute nodes 20 in the edge compute platform 10, or it may, in embodiments, correspond to a subset thereof. A subset may be relevant in situations where particular compute nodes 20 in the edge compute platform 10 are not directly accessible by a routing node 22.

This process is repeated for all available routing nodes 22 to determine global latency information on the edge compute platform 10. This will be discussed in detail below.

The term "all available" compute nodes 20 in the context of the edge compute platform 10 may, in embodiments, include all compute nodes 20 in the edge compute platform 10. However, the term "all available" compute nodes 20 may, in embodiments, include only compute nodes 20 which are available at any one time. For example, if a networked part of the edge compute platform 10 is offline or unavailable due to failure, shutdown, repair or any other reason for deselection, any compute nodes 20 included in that networked part will not be available and so may not be included in subsequent analysis. Any such compute nodes 20 that are unavailable may be identified by specific operational parameter data. This may take any suitable form. For example, one possible metric for operational parameter data for unavailable compute nodes 20 may comprise erroneous latency values, for example, a compute node 20 that is offline may return no latency value or a latency value which is effectively infinite between that node 20 and a routing node 22.

The term "all available" routing nodes 22 may, in embodiments, include all routing nodes 22 in the edge compute platform 10. However, the term "all available" routing nodes 22 may, in embodiments, include only routing nodes 22 which are available at any one time. For example, if a networked part of the edge compute platform 10 is offline or unavailable due to failure or shutdown, any routing nodes 22 included in that networked part will not be available and so may not be included in subsequent analysis. Any such routing nodes 22 that are unavailable may be unreachable or may be inaccessible at specific points in time, for example when an optimization process is carried out as described below.

Data store 116 is operable to obtain operational parameter data from the compute nodes 20-1, 20-2, **20-*n*. In embodiments, the operational parameter data obtained from the compute nodes 20-1, 20-2, 20-*n* may comprise load data for one or more compute nodes 20-1, 20-2, 20-*n*. Load data may include, but is not limited to, CPU usage, memory usage, storage I/O (e.g. disk I/O operations) and network I/O data for one or more compute nodes 20-1, 20-2, 20-*n***.

Data stores 114, 116 are shown schematically and described separately and classified by the data content stored in each case for clarity of understanding. However, it is to be understood that data stores 114, 116 need not require separate hardware and/or software and are not limited to separate units or functions. The functionality attributed to data stores 114, 116 may be combined and attributed to a single data store which handles operational parameter data from both compute nodes 20-1, 20-2, **20-*n* and routing nodes 22-1, 22-2, 22-*n***.

Application Provisioner 102 Operation

In this embodiment, the application provisioner 102 comprises distinct trained machine learning modules 106, 108 which are run sequentially in an optimization operation. An optimization operation using the application provisioner 102 is carried out at periodic intervals.

Any suitable interval period may be used. In embodiments, the interval period may be between 1 and 30 seconds. In embodiments, the interval period may be 5-15 seconds. In embodiments, the interval period may be 10 seconds.

For each instance of an optimization operation, the application provisioner 102 generates predicted data representative of a new state for one or more applications deployed on the edge compute platform 10. In embodiments, the application provisioner 102 generates predicted data representative of a new state for all applications deployed on the edge compute platform 10.

Figure 3:
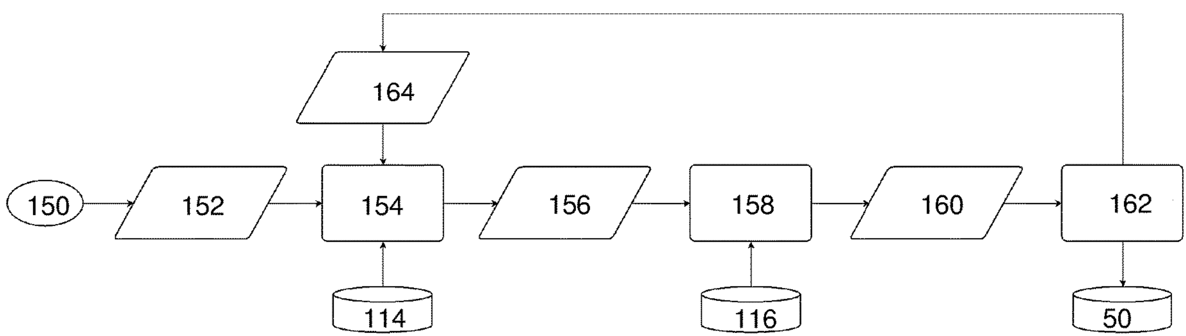
FIG. 3 is a flow chart showing the operation process of the embodiment of FIG. 2.
Figure 4:
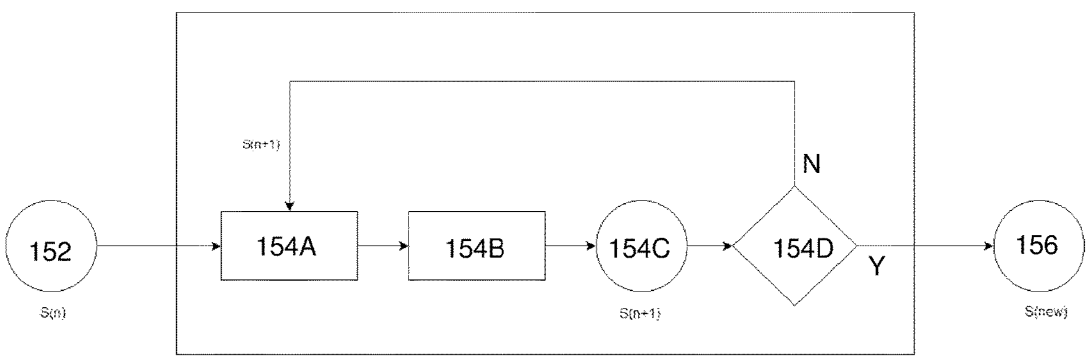
FIG. 4 is a flow chart showing an operation process for a latency optimizer forming part of the embodiment of FIG. 2.
Figure 5:
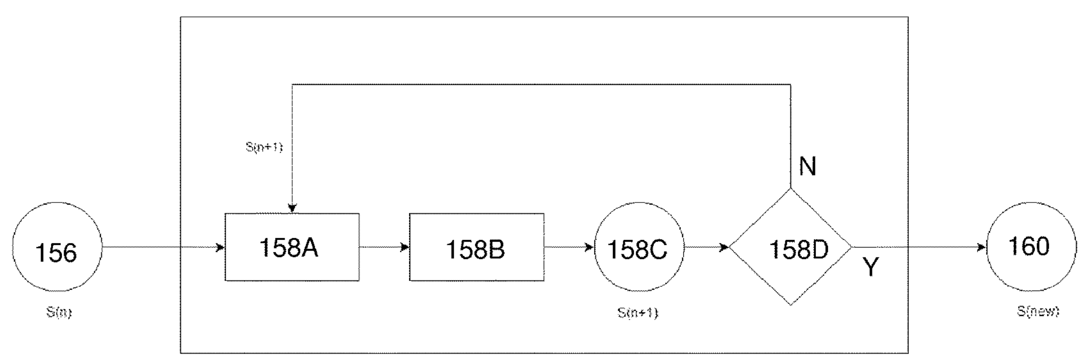
FIG. 5 is a flow chart showing an operation process for an auto-scaler forming part of the embodiment of FIG. 2.

FIG. 3 shows a flow chart illustrating the operation sequence for this embodiment. In this specific embodiment, the modules 106, 108 are optimized separately and run sequentially. FIGS. 4 and 5 show the specific optimization loops for each module 106, 108 as described below.

Note that, in embodiments, some of the optimization loops may be performed individually and do not require the full set of method steps. For example, latency optimization may be performed without auto-scaling optimization and vice versa. The disclosure is not intended to be limited to the combination of both processes.

Method

The following method relates to the steps occurring during an update to the application state initiated by the system manager 100 and/or the application provisioner 102 and/or the latency optimizer module 106. The method comprises a computer-implemented method of provisioning network resources in a distributed compute network having one or more compute nodes and one or more routing nodes. The method is executed by at least one hardware processor.

Step 150: Start

At step 150 the process is started. The process may be initiated manually or automatically. If initiated automatically this may be on a periodic basis or it may be on the basis of particular criteria being met. If the initiation is carried out at periodic intervals, any suitable interval period may be used. In embodiments, the interval period may be between 1 and 30 seconds. In embodiments, the interval period may be 5-15 seconds. In embodiments, the interval period may be 10 seconds.

Step 152: Determine Initial State

At step 152 the initial state of the application is determined. The state of the application corresponds, in embodiments, to the current virtual application deployment state on the edge compute platform 10. In other words, in embodiments, the state corresponds to the number and type of deployed virtual application instances **24-*n* of the application on the edge compute platform 10 across all the active compute nodes 20 hosting those virtual application instances 24-*n***.

In embodiments, the state may include information on the compute nodes 20 which are not hosting virtual application instances **24-*n*, i.e. compute nodes 20 which are deprovisioned with respect to the application. In embodiments, the current state may correspond to the overall configuration of the routing nodes 22 and compute nodes 20 on the edge compute platform 10**.

In other words, in embodiments, the current state of the application on the distributed compute network (which, in embodiments comprises the edge compute platform 10) comprises information relating to the current virtual application deployment state (i.e. number and location of virtual application instances **24-*n*) as well as configuration information on the distributed compute network itself (e.g. configuration and/or location of compute nodes 20 and routing nodes 22**).

The state may also comprise information relating to operational parameters of the edge compute platform 10 in a current configuration. Operational parameters may comprise, in embodiments, operational data such as load data on the compute nodes 20, latency data between compute nodes 20 and routing nodes 22 or other suitable data.

The initial state determined in step 152 corresponds to the current state of the application of the edge compute platform 10 at the time the message is implemented.

Step 154: Run Latency Optimizer Module

At step 154, the latency optimizer is initiated. The latency optimizer process is operable to optimise global latency on the edge compute platform 10. The process is shown in detail in the flow chart of FIG. 4.

By global latency is meant the latency for a given application as a function of the total local latencies for each instance of the application on the edge compute platform 10. In embodiments, the global latency may comprise an average latency across the edge compute platform 10.

By "given application" is meant one application or process which is run on the edge compute platform 10 and distributed across the edge compute platform 10 in the form of a plurality of virtual application instances **24-*n*. It is to be understood that there is no specific limit on the number of applications that can be run on the edge compute platform 10**.

However, whilst one or more applications may be run concurrently on the edge compute platform 10, each application is in practical effect treated independently from other applications and insulated therefrom. Thus, the present method is concerned with a single application potentially having multiple virtual application instances 24-*n* on the edge compute platform 10, even though one or more other applications may also be handled by the edge compute platform 10 concurrently.

In embodiments, the optimized global latency for a given application is the optimized global latency of the averaged sum of the optimized local latencies for each available routing node 22 for that application. In embodiments, the optimized local latency for each routing node 22 is the lowest latency compute node 20 to which the respective routing node 22 can send and/or receive data. In embodiments, the global latency may have an optimal value when all available compute nodes 20 are deployed.

The latency optimizer process in step 154 is shown in detail in FIG. 4. As noted above, at step 152 the initial state of the application is determined. The initial state of the application is the current state of the application on the edge compute platform 10 at the time the latency optimizer process in step 154 is initiated.

Data, including operational parameter data, relating to the current state of the application is received by the latency optimizer module 106 from the data store 114. The latency optimizer 106 obtains routing operational parameter data for each routing node 22. In embodiments, the routing operational parameter data may comprise request data (e.g. number and type of requests, total request numbers) and/or packet distribution data for each available routing node 22. The operational parameter data may in embodiments comprise request data and/or packet distribution data between each available routing node 22 and each available compute node 20.

The operational parameter data may comprise the number of requests/packets received by each routing node 22. In addition, the operational parameter data may comprise, for each routing node 22, the latencies between that routing node 22 and each compute node 20 available to that routing node 22. These values are determined and/or obtained by the latency optimizer 106.

In embodiments, the data store 114 provides latency data relating to a current state of the distributed compute network. The latency data comprises measured and/or predicted local latency values for each routing node 22, the local latency values corresponding to the measured and/or predicted latency between an available routing node 22 and each available compute node 20 accessible by the routing node 22.

At step 154A, the latency optimizer module 106 is run. Based on the received operational parameter data, the number of requests/packets received by each routing node 22 can be determined and, for each routing node 22, the latencies to each available compute nodes 20 can be determined.

Based on this data, a trained machine learning (ML) routing algorithm of the latency optimizer 106 is operable to route all received data packets to the optimal compute node 20. The training of the ML routing algorithm will be discussed below.

By optimal compute note 20 is meant the compute node 20 in communication with the respective routing node 22 that is available at the current time and has the lowest of latency.

The value of the global latency is determined, in embodiments, as follows. For each routing node 22 the number of requests and the latency of each request to each available compute node 20 is known. This information is used to determine the global latency.

Consider an example where an exemplary edge compute platform 10 comprises three routing nodes 22 and two compute nodes 20 having the following measured requests and latencies:

Routing node 1: 100 requests; latency to compute node 1: 5 ms; and latency to compute node 2: 15 ms.

Routing node 2: 200 requests; latency to compute node 1: 35 ms; and latency to compute node 2: 7 ms.

Routing node 3: 20 requests; latency to compute node 1: 15 ms; and latency to compute node 2: 12 ms.

Assuming all of the compute nodes 1 to 3 are deployed, this provides following calculation for the global latency:

((100*5 ms)+(200*7 ms)+(20*12 ms))/320=6.6875 ms to serve the request. This is expressed in equation 1) below:

$$L - \frac{\sum_{i=0}^{N} r_i \cdot 1\_\min_i}{\sum_{i=0}^{N} r_i}, \tag{1)}$$

where N is number of routing nodes; $r_i$ is number of requests/packets hitting the routing node l, l_min is latency to the optimal edge compute node from routing node i.

The optimized global latency for a given application hosted on a given edge compute platform 10 at a given time point is achieved if all available compute nodes 20 are utilized. In other words, in this scenario, all routing nodes 22 will route data to the most optimal compute node 20 for each routing node 22. In this example, "most optimal" refers to the most optimal in terms of latency (with the lowest value of the latency being optimal).

If all available compute nodes 20 are used in the optimization, then the global latency calculated using equation 1) will be the optimized global latency which is the averaged sum of the optimized local latencies between each routing node 22 and the lowest latency compute node 20 to that routing node 22.

If all compute nodes 20 are deployed as above, then the optimized global latency may be achieved. The optimized global latency may be defined for a given current application state as a benchmark maximum value of the latency that is achievable through the optimization process. The latency optimizer module 106 is trained (discussed below) to approach or achieve this value when determining a new state of the application.

However, in practice, real-world constraints may prevent the optimized global latency from being achieved. For example, deploying all available compute nodes 20 may be sub-optimal in terms of parameters such as hosting cost or energy usage.

Further, the value of the optimized global latency may be in excess of what is needed practically and commercially. For example, if the optimized global latency that an edge compute platform 10 can deliver is X ms but an end user only requires a global latency of 2× ms for a particular application, the computational and economic cost of using additional compute resources to provide the lower latency is not required.

Therefore, there is a necessary trade-off between global latency and practical commercial and technical constraints during operation of the edge compute platform 10.

In embodiments, one or more latency thresholds for the application may be defined. These thresholds may be based on any specific value(s), for example the terms of a service level agreement (SLA). In embodiments, a latency threshold may be 20% greater than the optimized global latency. In embodiments, a latency threshold may be 10% greater than the optimized global latency. In embodiments, a latency threshold may be 7.5% greater than the optimized global latency.

Alternatively or additionally, the latency thresholds may be set based on a numerical value above the optimized global latency. In embodiments, a latency threshold may be 20 ms above the optimized global latency. In embodiments, a latency threshold may be 10 ms above the optimized global latency. In embodiments, a latency threshold may be 5 ms above the optimized global latency.

Alternatively or additionally, the latency thresholds may be set based on a fixed numerical value above the optimized global latency. By this is meant that the latency thresholds do not have a direct dependence upon the value of the optimized global latency other than that latency thresholds have a latency value which is higher than the optimized global latency.

In embodiments, a latency threshold may be 40 ms provided this is above the optimized global latency. In embodiments, a latency threshold may be 20 ms provided this is above the optimized global latency. In embodiments, a latency threshold may be 15 ms provided this is above the optimized global latency. However, these values are not to be taken as limiting and other values may be used.

In embodiments, multiple latency thresholds may be used. These may be specified in an end user SLA and may give the end user multiple options for guaranteed latency values as part of the SLA. For example, a user may pay a reduced fee in return for a higher guaranteed latency value. Therefore, in embodiments, a plurality of latency thresholds may be implemented.

In embodiments, a first latency threshold may be 20% greater than the optimized global latency. In embodiments, a second latency threshold may be 10% greater than the optimized global latency. In embodiments, a third latency threshold may be 7.5% greater than the optimized global latency, and so on.

The one or more latency thresholds define for the latency optimizer module 106 and associated trained ML algorithm acceptable threshold level for latency within the optimization space. In other words, the trained ML algorithm will attempt to minimize global latency whilst also minimizing the number of compute nodes 20 needed to deploy the application. Consequently, within the optimization space a lower value for the global latency is preferred, but a value at or below the threshold level will be sufficient for a new state to be adopted as discussed below.

Consider, for example, a request distribution where the majority of traffic is to a given compute node A with very little traffic to other available compute nodes. The solution for optimized global latency is to deploy all compute nodes.

However, this may lead to increased costs for a small benefit in latency. Instead, the latency optimizer module 106 may select only the compute node A and deprovision other compute nodes 20 for a small increase in global latency but which is still within the threshold latency level. This has the technical effect of reducing the costs for the user whilst ensuring that the latency is still within acceptable limits and/or the agreed user SLA.

In embodiments, the target latency for the latency optimizer module 106 is the optimal latency calculated based on deployment of all the available compute nodes 20.

The trained ML algorithm of the latency optimizer module 106 may use one or more strategies to determine a new state. In embodiments, the latency optimizer module 106 may use a "greedy" optimization strategy.

In embodiments, the latency optimizer module 106 may choose the action to provision to a compute node 20 that has the most effect on the global latency when deployed in a given application state. In other words, the latency optimizer module 106 will provision compute nodes 20 that have the most impact on lowering latency.

The action may be—'Provision compute node X', 'Deprovision compute node X' or 'No action'. When a compute node 20 is deprovisioned (or not provisioned in the first place), by this is meant that the compute node 20 is not assigned for use in hosting one or more virtual application instances 24-*n* of the application 24. In other words, the compute node 20 is not selected for deployment of any virtual application instances 24-*n* of the application 24. Of course, the compute node 20 may still be deployed for other concurrent applications other than the application 24.

In embodiments, more than one provision or deprovision action may be specified simultaneously as an "action" in a selection process. For ease of reference, the reference to "an action" may comprise one or more provision and/or deprovision operations.

Consider a situation where for an initial state (i.e. a new initialization), no compute nodes 20 have been selected or provisioned in the edge compute platform 10. The latency optimizer module 106 receives operational parameter data in step 152. If for example significant traffic is identified in a particular routing node 22 of the edge compute platform 10, the latency optimizer module 106 will deploy a compute node 20 close (in terms of latency) to that routing node 22. The trained machine learning algorithm will, based on the training it has received, select a suitable compute node 20 which will have the greatest impact on latency out of the available compute nodes 20.

Once an action has been proposed, the method proceeds to step 154B where the proposed action is applied to the initial state to generate a new state $S_{(n+1)}$ at step 154C.

At step 154D it is determined whether the new state meets the desired parameters for deployment of that new state. This may be based on any suitable parameter. In embodiments, a parameter may comprise one or more acceptable latency thresholds for the application. These may be based on any specific value(s), for example the terms of a service level agreement (SLA). In embodiments, a latency threshold may be 20% greater than the optimized global latency. In embodiments, a latency threshold may be 10% greater than the optimized global latency. In embodiments, a latency threshold may be 7.5% greater than the optimized global latency.

The determination of whether a state meets the required threshold criteria may also mean that the state has an optimal number of compute nodes 20 being deployed based on commercial or technical criteria.

A desired state is reached when the latency and/or compute node 20 deployment is determined to be optimal. In other words, the process is iterated until the desired target level of latency is reached with the minimal number of compute resources (e.g. the minimum number of virtual application instances 24-*n* deployed across the compute nodes 20).

If at step 154D it is determined that the new state is an optimal and/or maximized state, the method proceeds to step 156 where the new state $S_{(new)}$ is defined.

If at step 154D it is determined that the new state is not an optimal and/or maximized state, the method proceeds back to step 154A where the optimization process is repeated starting with state $S_{(n+1)}$ as an initial state. This may continue iteratively until convergence on a desired, optimal or maximized state is reached and the method proceeds to step 156 with the new state $S_{(new)}$.

Consider an example where the latency optimizer module 106 is run in step 154A where the initial state corresponds to a state where no compute nodes 20 have been deployed.

Step 154A is performed to generate an action, for example provisioning a compute node 20. The compute node 20 is then provisioned in step 154B and the resulting global latency determined. If this value is within the threshold value (for example, 7.5% greater than the optimized global latency in one embodiment) then the process can proceed to step 156. If the relevant criteria are not met in step 154D, a further iteration is run to generate a new state, and so on.

Returning to FIG. 3, the state $S_{(new)}$ generated in step 156 and the method proceeds to step 158.

Step 158: Application Auto-Scaler Module

At step 158, the application auto-scaler module 108 is executed based on the new state defined at step 156. After the compute nodes 20 are selected using the latency optimizer module 106, the application auto-scaler module 108 is executed to generate the optimal number of virtual application instances 24-*n* per compute node 20 to provide optimal number of virtual application instances 24-*n* to meet the required load whilst minimizing compute resources.

The functionality of the application auto-scaler module 108 is shown in FIG. 5. At step 156 the new state generated in step 156 is provided to the application auto-scaler module 108 as the initial state.

At step 158A, the application auto-scaler 108 utilizes the initial state of the platform 10 which may, in embodiments, include the virtual application instances 24-*n* deployed in any one compute node 20.

The application auto-scaler 108 may consider load, the current traffic hitting the region, and other operational parameter data in order to determine an action. The actions are proposed based on a trained machine learning algorithm forming part of the application auto-scaler module 108.

Actions which may be proposed may include: "Add n virtual application instances to compute node X', 'Remove n virtual application instances from compute node X', or 'No action'.

In other words, any suitable number of virtual application instances 24-*n* may be added or removed from a compute node X in a single action in step 158A.

The add virtual instance action is taken when current number of virtual application instances 24-*n* either cannot handle the load, or the load is close to or above a predetermined maximum. For example, in embodiments, if the resource usage of existing virtual application instances 24-*n* in a given compute node 20 is above the target range, then an action to add another virtual application instance 24-*n* to the compute node 20 will reduce the load of existing virtual application instances 24-*n* and direct the resource usage towards the target range. As noted above, more than one virtual application instance 24-*n* may be added in this action step.

If the resource usage is below the target range, then "remove virtual instance from compute node" action can be taken to increase the resource usage up to the target range, i.e., removing a virtual application instance will increase the resource usage of existing virtual application instances 24-*n* and bring the average load of the virtual application instances 24-*n* running on the compute node 20 into the target range. This will have the effect of releasing compute resources for other applications than application 24. The 'No action' action means that application auto-provisioner module 108 proposes no change to the state.

Once an action has been proposed, the method proceeds to step 158B where the proposed action is applied to the initial state to generate a new state $S_{(n+1)}$ at step 158C.

At step 158D it is determined whether the new state is a desired state. This may be based on any suitable parameter. In embodiments, a parameter may comprise the acceptable load for each compute node 20 running a virtual application instance 24-*n* of the application. This may be based on any specific value, for example the terms of a service level agreement (SLA).

The determination of a desired state may also mean that the state has an optimal number of virtual application instances 24-*n* being deployed on the compute nodes 20 defined and provisioned in the state set in step 156 based on commercial or technical criteria.

A desired state is reached when the average load on the virtual application instances on each compute node 20 deployment is determined to be optimal. In other words, the process is iterated until the desired target level of load is reached with the minimal number of compute resources (e.g. the minimum number of virtual application instances 24-*n* deployed across the compute nodes 20).

If at step 158D it is determined that the new state is an optimal and/or maximized state, the method proceeds to step 160 where the new state $S_{(new)}$ is defined.

If at step 158D it is determined that the new state is not an optimal and/or maximized state, the method proceeds back to step 154A where the optimization process is repeated starting with state $S_{(n+1)}$ as an initial state. This may continue iteratively until convergence on a desired, optimal or maximized state is reached and the method proceeds to step 160 with the new state $S_{(new)}$.

Returning to FIG. 3, at step 160 a new state which has been optimized by both the latency optimizer module 106 and the application auto-scaler module 108 is generated. The new state contains operational parameter data relating to the desired number and selection of compute nodes 20 for deployment and the number of virtual application instances 24-*n* within each of those compute nodes 20.

Step 162: Apply New State

These steps define new state of virtual deployments for the application in question. The new state is then applied to the edge compute platform 10 by the orchestrator 50 in step 162 which, upon receiving a request from the application provisioner 102 to change state, updates the state of the edge compute platform 10.

When the next periodic initiation of the process occurs, the new state can be sent in step 164 to the latency optimizer module 106 in step 154 as a new initial state of the application.

Latency Optimizer Training Process

The latency optimizer module 106 comprises a trained machine learning model. In embodiments, the latency optimizer module 106 comprises a trained machine learning model utilizing reinforcement learning.

Reinforcement learning comprises a training process in which actions selected from a possible action space are taken in a state space in order to maximize a cumulative reward. An example of a reinforcement learning environment may be a Markov decision process (MDP).

An objective of a reinforcement learning training process is for the Machine Learning (ML) algorithm to be trained to adopt an optimal or close to optima strategy that maximizes a "reward function". A reward function, in embodiments, comprises a reinforcement signal that accumulates from rewards for actions which improve one or more parameters of a given state, and/or penalties for actions which worsen one or more parameters of the state of the training environment.

As noted above, the latency optimizer module 106 is operable to select the most appropriate compute nodes 20 for a deployment of a given application in order to optimize the latency and ensure target Quality of Service (QoS) metrics for the users 18 of the application.

In embodiments, the latency optimizer module 106 is trained using reinforcement learning. The machine learning training module 110 enable the module 106 to be trained and refined based on real-world and/or simulated data from the edge compute platform 10 to optimize decision making by the module 106.

In embodiments, training parameters for use in the training process may include operational parameter data for the edge compute platform 10. In embodiments, operational parameter data may include the number of requests/packets hitting certain routing nodes 22. This provides information on the weightings to apply to the latency for all the requests coming from that routing node 22 towards the optimal, in terms of latency, compute node 20 to encourage actions to be taken to select the optimal compute node 20.

This training parameters may be obtained from operational parameter data which is measured and/or estimated or otherwise inferred from real-world operation on the edge compute platform 10 or any other suitable network or scenario.

Alternatively or additionally, synthetic training data may be generated from real-world operations on the or another edge compute platform 10. Alternatively or additionally, synthetic training data may be obtained without real-world data and instead generating training data from computational simulations or computational models of the compute nodes 20 and routing nodes 22 of the edge compute platform 10.

In addition, the latencies from the routing node to all the edge compute nodes (the best one is selected).

The defined action space for the training process for the latency optimizer module 106 includes, in non-limiting embodiments, three core actions—'Provision compute node X', 'Deprovision compute node X' or 'No action'.

Method

The following method relates to the steps occurring during a training process for training the ML model forming part of the latency optimizer module 106. The method comprises a computer-implemented method of training a machine learning model for dynamic provisioning of compute resources in a distributed compute network having one or more compute nodes and one or more routing nodes. The method is executed by at least one hardware processor.

Figure 6:
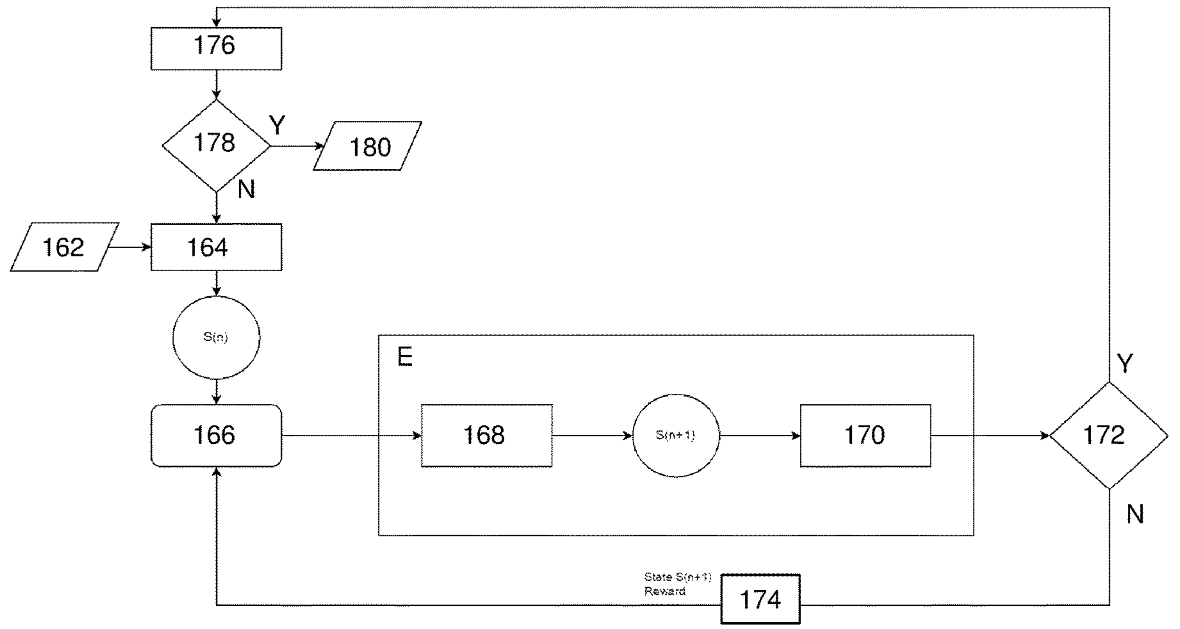
FIG. 6 is a flow chart showing an operation process for a training process for the latency optimizer forming part of the embodiment of FIG. 2.

A flow diagram illustrating the training process is shown in FIG. 6.

Step 162: Start

At step 162 the process is started. The process may be initiated manually or automatically. If initiated automatically this may be on a periodic basis or it may be on the basis of particular criteria being met, for example if the configuration of the edge compute platform 10 changes in use or if the selection of actions by the latency optimizer module 106 requires improvement or updating. If the initiation is carried out at periodic intervals, any suitable interval period may be used.

Step 164: Set New Scenario

A current state of the application on the edge compute platform 10 may be used as a starting state. The current state of the application corresponds, in embodiments, to the current virtual application deployment state within the edge compute platform 10. In other words, in embodiments, the state corresponds to the number and type of deployed virtual application instances 24-*n* of the application 24 on the edge compute platform 10 across all the active compute nodes 20 hosting those virtual application instances 24-*n*.

In embodiments, the state may also include information on the compute nodes 20 which are not hosting virtual application instances 24-*n*, i.e. compute nodes 20 which are deprovisioned with respect to the application 24. In embodiments, the state may correspond to the overall configuration of the routing nodes 22 and compute nodes 20 on the edge compute platform 10.

The state may also comprise information relating to operational parameters of the edge compute platform 10 in a current configuration. Operational parameters may comprise, in embodiments, operational data such as load data on the compute nodes 20, latency data between compute nodes 20 and routing nodes 22 or other suitable data.

The current state $S_{(n)}$ comprises current latencies between one or more routing nodes 22 and one or more compute nodes 22 in the edge compute platform 10. In embodiments, the starting state includes the current latencies of all the available routing nodes 22 and all the available compute nodes 20, a list of deployed compute nodes 20, and the current latency achieved with the compute nodes 20.

The latency optimizer module 106 is periodically trained by running number of scenarios having different starting states corresponding to current states of the application on the edge compute platform 10 at the times when the training process is run.

However, this is not to be taken as limiting and other scenarios may be used. For example, these scenarios may be based on modified or processed real world measured data, real-world data used at a time offset or the scenarios may be generated synthetically.

If synthetic training scenarios and data are used these may be generated from real-world operations on the or another edge compute platform 10. Alternatively or additionally, synthetic training data may be obtained without real-world data and instead generating training data from computational simulations or computational models of the compute nodes 20 and routing nodes 22 of the edge compute platform 10.

Irrespective of how the scenario is derived, the process starts with a training state $S_{(n)}$ which is passed to the latency optimizer module 106 to select action(s) in step 166.

Steps 166-178: Latency Optimizer Training

At step 166 the scenario S(n) is provided to the training module 110. The training module 110 explores different actions during each iteration of a given training episode. This will now be described.

In step 166 the training module 110 proposes an action. This action is then applied to the current state in step 168. This produces a new simulated state of the edge compute platform 10 within the simulated training environment E. The success or failure of a particular action is reflected in a reinforcement learning reward or penalty calculated using a reward function at step 170. The reward function evaluates how good the proposed action by the agent is. The reward function therefore evaluates how the latency is improved or worsened by any given action taken. In embodiments, the value of the reward function is a function of the resulting change in global latency within the simulated state resulting from the action on the state.

Once the reward for the state $S_{(n+1)}$ has been determined, it is determined whether a termination criterion is reached at step 172. This may, in embodiments, comprise meeting a particular reward target or other criterion. If the criterion or criteria is not met, the process returns to step 166 and the training process is repeated based on state $S_{(n+1)}$ and the determined reward in step 170. This process continues for one or more iterations $S_{(n+i)}$ (where i is the $i^{th}$ iteration) until the termination criterion is met at step 172.

If the criterion is met, the episode is terminated. When the episode is terminated the trained ML model of the latency optimizer module 106 is updated at step 176 with the improved information obtained by taking actions and receiving specific rewards.

In other words, when the training process is complete the latency optimizer module 106 can then be updated with the new training data at step 176. At step 178 it is determined whether the required performance has been reached. This may be based on any specific metric; for example, whether the latency optimizer module 106 can configure a state of the edge compute platform 10 to meet latency demands whilst minimizing compute node 20 resources used.

If the required performance is met at step 178, the process ends at step 180 and the latency optimizer module 106 can then be run to update the virtual application deployment state based on the new trained algorithm(s).

To achieve this, the latency optimizer module 106 is invoked by the system manager 100 based on the current virtual application deployment state. The latency optimizer module 106 proposes the best action to take for the current state to any target levels of Quality of Service. If the target states are met, then the orchestrator 50 is utilized to update the virtual application deployment state based on the new state parameters.

However, if the target latency Quality of Service is not achieved the latency optimizer module 106 is invoked again to propose a new action or set of actions, this time with the updated state. This is repeated until the target latency Quality of Service is achieved.

However, if the required performance is not met at step 178, then the training process is repeated from step 164 above.

Application Auto-Scaler Agent Training

The application auto-scaler module 108 is operable, in use, to determine an optimal number of virtual application instances 24-*n* running in a compute node 20 to support the load hitting the compute node 20.

As described above with reference to FIGS. 3 to 5, the selection of optimal compute nodes 20 is done by the latency optimizer 106. Thus, the role of the application auto-scaler 108 is to provision these nodes 20 with the correct number of virtual application instances 24-*n* to ensure that load is managed appropriately for the application across these virtual application instances 24-*n*.

The application auto-scaler module 108 is trained using reinforcement learning by the training module 112. In embodiments, the application auto-scaler 108 is trained by the training module 112 using synthetic or simulated data. In embodiments, the synthetic or simulated data is generated mathematically and is not derived from real-world measured data.

In embodiments, this has the advantage that the lead time before the accuracy and performance of the auto-scaler module 108 reaches an acceptable level is significantly reduced when compared to traditional training scenarios based on machine learning.

The application auto-scaler training utilizes data collections that encapsulate relationships between observations of independent parameters related to the system load. These parameters may include but are not limited to: the size of incoming/outgoing traffic, process count, memory footprint, number of virtualization containers, disk I/O, network and port usage statistics, prior knowledge to application resource requirements, direct observations of resulting system load of interest (e.g., percentage of CPU utilization).

These parameters are then used to generate synthetic data collections. In embodiments, real-world data is not required to generate these data collections. Different sequences are mathematically generated for each independent parameter of interest, and then this data can be used to produce corresponding system load values with different types of load functions.

Examples of functions that can be used to generate different sequences may comprise: a constant function requests trend; linear function requests trend; quadratic function requests trend; and polynomial requests trend.

These simulated values and simulated trends produce synthetic datasets that simulate scenarios of different shapes and sizes of traffic, levels of workload, computational budget, application resource-intensiveness, etc. This provides the load prediction training workflow with abundant and diverse scenarios to learn from and accommodate. This improves the quality of the trained algorithm without any reliance on real-world data.

The information in these datasets is used to improve automatic load balancing in the network system 10 by building a load prediction model for use by the auto-scaler module 108. The target for the load prediction model is to capture the relationship between independent performance parameters and other system metrics and the system load of interest.

This relationship may be complicated and highly non-linear. As a result, the prediction model may utilize machine learning, statistical data analysis and regression techniques. In embodiments, this enables the training process to determine the optimal relationships between parameters.

In embodiments, this is achieved by using a reinforcement learning model which iteratively modifies model parameters to fit the training target values given observed features. A flow chart of the training process is shown in FIG. 7.

Method

The following method relates to the steps occurring during a training process for training the ML model forming part of the application auto-scaler module 108. The method comprises a computer-implemented method of training a machine learning model for dynamic provisioning of compute resources in a distributed compute network having one or more compute nodes and one or more routing nodes. The method is executed by at least one hardware processor.

Figure 7:
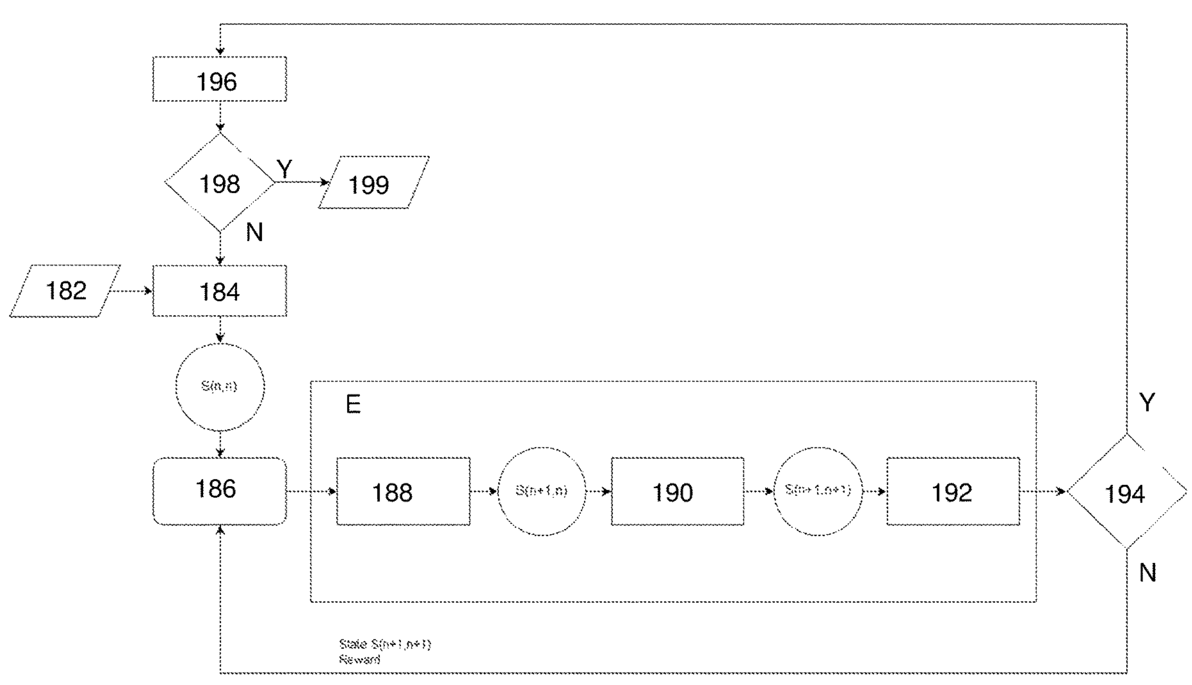
FIG. 7 is a flow chart showing an operation process for a training process for the auto-scaler forming part of the embodiment of FIG. 2.

A flow diagram illustrating the training process is shown in FIG. 7.

Step 182: Start

At step 182 the process is started. The process may be initiated manually or automatically. If initiated automatically this may be on a periodic basis or it may be on the basis of particular criteria being met, for example if the configuration of the edge compute platform 10 changes in use or if the selection of actions by the application auto-scaler module 108 requires improvement or updating. If the initiation is carried out at periodic intervals, any suitable interval period may be used.

Step 184: Set New Scenario

A current state of the application on the edge compute platform 10 may be used as a starting state. The current state of the application corresponds, in embodiments, to the current virtual application deployment state within the edge compute platform 10. In other words, in embodiments, the state corresponds to the number and type of deployed virtual application instances 24-*n* of the application 24 on the edge compute platform 10 across all the active compute nodes 20 hosting those virtual application instances 24-*n.*

In embodiments, the state may also include information on the compute nodes 20 which are not hosting virtual application instances 24-*n*, i.e. compute nodes 20 which are deprovisioned with respect to the application. In embodiments, the state may correspond to the overall configuration of the routing nodes 22 and compute nodes 20 on the edge compute platform 10.

The state may also comprise information relating to operational parameters of the edge compute platform 10 in a current configuration. Operational parameters may comprise, in embodiments, operational data such as load data on the compute nodes 20 or other suitable data.

Steps 186-198: Application Auto-Scaler Training

At step 186 the scenario state $S_{(n,n)}$ is provided to the training module 112. Note that state $S_{(n,n)}$ has two identifiers. The first represents the state number (i.e. the initial state is 1, the second 2 etc. for each iteration of the training process) as for the latency optimizer training discussed above. However, the second identifier represents the load prediction for that state. The reason for this is discussed below.

At step 186 the scenario having state $S_{(n,n)}$ is provided to the training module 112. The training module 112 explores different actions during each iteration of a given training episode. This will now be described.

In step 186 the training module 110 proposes an action in the action space. The action space is a simulated training environment representative of the distributed compute network in a given state defined in step 184. For each state, one or more actions are available in the action space for that state, where each action is operable to transition the distributed compute network in the training environment from the current state to a new state.

The action space for a given state in the reinforcement training environment E includes, in embodiments, the following actions—"Add n virtual application instances to compute node X", "Remove n virtual application instances to compute node X" and "No action" for each compute node 20 in the simulated scenario. A single action step may comprise one addition or removal of a virtual application instance on one compute node 20 or may comprise, in embodiments, one or more additions of virtual instances and/or one or more removals of virtual instances from a plurality of compute nodes 20.

This action is then applied to the current state in step 188 in the training environment E. This produces a new simulated state $S_{(n+1,\ n)}$ of the edge compute platform 10 within the simulated training environment E.

At step 190, a load predictor model is used to determine the load resulting from the new configuration of virtual application instances in state $S_{(n+1,\ n)}$following the action applied in step 188. The load predictor model comprises an ML model forming part of the application auto-scaler module 108 which is assessed by splitting data into 'training' and 'validation' sets, and then fitting the model until a desirable performance level is reached in terms of standard regression metrics (e.g., mean absolute error).

The application auto-scaler module 108 is trained using reinforcement learning by the training module 112. In embodiments, the load predictor model of the application auto-scaler 108 is trained by the training module 112 using synthetic or simulated data. In embodiments, the synthetic or simulated data is generated mathematically and is not derived from real-world measured data.

In embodiments, this has the advantage that the lead time before the accuracy and performance of the auto-scaler module 108 reaches an acceptable level is significantly reduced when compared to traditional training scenarios based on machine learning.

The application auto-scaler training utilizes data collections that encapsulate relationships between observations of independent parameters related to the system load. In other words, prior to invoking the load predictor model of the auto-scaler module 108 in step 190 to determine the new load distribution, the load predictor model is trained using training data generated from a time-series sequence of simulated values representative of one or more parameters of one or more compute nodes.

These parameters may include but are not limited to: the size of incoming/outgoing traffic, process count, memory footprint, number of virtualization containers, disk I/O, network and port usage statistics, prior knowledge to application resource requirements, direct observations of resulting system load of interest (e.g., percentage of CPU utilization).

For each parameter, the time-series sequence of simulated values has a pre-defined range dependent upon simulated ranges of the parameter under consideration. For example, particular physical or practical limitations on any one parameter may define the suitable operating range for that parameter which is reflected in the simulated data.

These parameters are then used to generate synthetic data collections. In embodiments, real-world data is not required to generate these data collections. Different sequences of simulated values are mathematically generated for each independent parameter of interest, and then this data can be used to produce corresponding system load values with different types of load functions. In other words, the generated training data relating to the distributed compute network comprises simulated load data relating to one or more parameters of one or more compute nodes 20.

Examples of functions that can be used to generate different sequences may comprise: a constant function requests trend; linear function requests trend; quadratic function requests trend; and polynomial requests trend.

These simulated values and simulated trends produce synthetic datasets that simulate scenarios of different shapes and sizes of traffic, levels of workload, computational budget, application resource-intensiveness, etc. This provides the load prediction training workflow with abundant and diverse scenarios to learn from and accommodate. This improves the quality of the trained algorithm without any reliance on real-world data.

Once built, the load prediction model is used to forecast the system load from the current observed system state $S_{(n+1,\ n)}$ of the edge compute platform 10 in step 190. The forecasted load values indicate future system load states for different actions of the auto-scaler module 108, and thus are operable to identify optimal actions.

Further, this information is operable, in embodiments, to influence the auto-scaler module 108 to incentivize actions that result in improved system loads. By improved system load is meant that the average load of the virtual application instances 24-*n* running on the compute node 20 is within specified target parameters. As a result, the load prediction component of the application auto-scaler 108 augments the load balancing training workflow.

In step 190, the load predictor is applied to the state $S_{(n+1,\ n)}$ returned by the application auto-scaler environment E within a given training iteration, which already contains the updated state $S_{(n+1,\ n)}$ including the number of virtual application instances 24-*n*. The updated state $S_{(n+1,\ n)}$ is generated by the proposed action in step 188.

It is noted that the load predictor only updates the new predicted load (use of system resources) after the action was taken in step 188. This is because if the load is high, the addition of another virtual application instance 24-*n* decreases the load of all the virtual application instances. Conversely, if the number of virtual application instances is decreased, then the load on the remaining virtual application instances should increase, assuming the same traffic load is hitting the virtual application instances 24-*n*.

The load predictor is therefore used to predict the load state of the virtual application instances 24-*n* of the application 24 so the algorithm can evaluate if the target load state is reached. The state in which the predicted load is updated for the state n+1 is then $S_{(n+1,\ n+1)}$ and the method proceeds to step 192.

The success or failure of a particular action is reflected in a reinforcement learning reward or penalty calculated using a reward function at step 192. The reward function evaluates how good the proposed action determined in step 186 and applied in step 188 is. The reward function therefore evaluates how the load (determined in step 190) is improved or worsened by any given action taken.

Once the reward for the state $S_{(n+1,\ n+1)}$ has been determined, it is determined whether a termination criterion is reached at step 194. This may, in embodiments, comprise meeting a particular reward target or other criterion.

If the criterion or criteria is not met, the process reverts to step 186 for a further iteration.

In other words, the training process is repeated based on state $S_{(n+2,\ n+2)}$ and the determined reward in step 192. This process continues for one or more iterations $S_{(n+i,\ n+i)}$ (where i is the $i^{th}$ iteration) until the termination criterion is met at step 194.

If the criterion is met, the training episode is terminated. When the episode is terminated the trained ML model of the application auto-scaler module 108 is updated at step 196 with the improved information obtained by taking actions and receiving specific rewards. In other words, when the training process is complete the application auto-scaler module 108 can then be updated with the new training data at step 196.

At step 198 it is determined whether the required performance has been reached. This may be based on any specific metric; for example, whether the application auto-scaler 108 can configure a state of the edge compute platform 10 to meet load demands whilst remaining within determined thresholds.

If the required performance is met at step 198, the process ends at step 199.

Once the application auto-scaler module 108 is trained, it is used to update the virtual application instances 24-*n* within a compute node 20. The application auto-scaler module 108 is invoked by the system manager 100 with the current application deployment state. The application auto-scaler module 108 proposes the best action to take for the provided state.

Variations—First Embodiment

Whilst the above embodiments have been described with reference to the use of trained machine learning models for each of the latency optimizer module 106 and auto-scaler module 108, this need not be the case.

For example, the latency optimizer module 106 and/or the auto-scaler module 108 may operate as described above in accordance with steps 150 to 162 whilst actions proposed in step 154A and 158A may be proposed based on alternative methodology.

For example, the latency optimizer module 106 and/or auto-scaler module 108 may use one or more alternative functionalities or strategies to determine a new state. These may include optimization strategies such as linear optimization, or may use heuristics or empirical datasets to determine one or more actions to choose in steps 154A and 158A.

In addition, whilst, in embodiments, the combination of sequential optimization of latency and load confers numerous advantages over known arrangements, in embodiments either the latency optimizer module 106 and/or auto-scaler module 108 may be used individually in specific circumstances.

System Manager Overview—Second Embodiment

Figure 8:
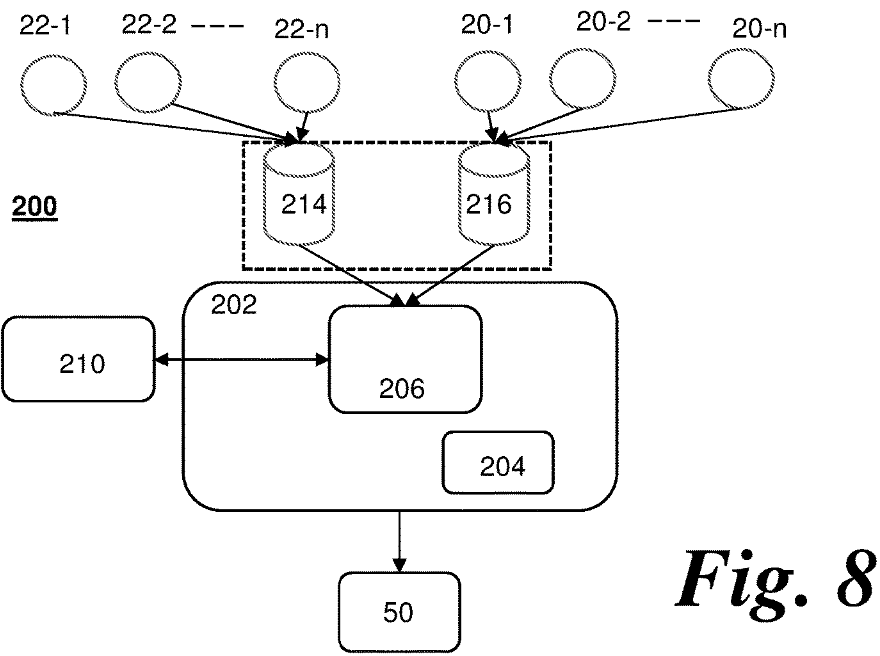
FIG. 8 is a schematic diagram of a system manager 200 according to a second embodiment of the present invention.

FIG. 8 shows a schematic diagram of the system manager 200 according to a second embodiment. The second embodiment differs from the first embodiment in that the latency optimizer integrated module 206 and application auto-scaler module 208 are integrated into a common unified system.

The system manager comprises the orchestrator 50 and an application provisioner 202. The application provisioner 202 is executed on a hardware system having at least one physical processor 204.

The application provisioner 202 comprises an integrated latency optimizer and auto-scaler integrated module 206. The integrated module 206 comprises trained machine learning algorithms. The integrated module 206 focuses on optimizing both load and latency in the network system 10 simultaneously and generate updated states for the edge compute platform 10. The updated states are then implemented by the orchestrator 50.

In other words, the orchestrator 50 applies and updates the application state by provisioning/deprovisioning the compute nodes 20 and scaling of the virtual application instances 24-*n* (which may, in embodiments, comprise containers) on those compute nodes 20 according to an optimal state derived by the application provisioner 202.

The application provisioner 202 is operatively connected to a machine learning training module 210. The machine learning training module 210 enables the integrated module 206 to be trained and refined based on real-world and/or simulated data from the edge compute platform 10 in order to optimize decision making by the integrated module 206.

The application provisioner 202 is operatively connected to data stores 214, 216. Data store 214 is operable to obtain operational parameter data from the routing nodes 22-1, 22-2, 22-*n*. In embodiments, the operational parameter data from the routing nodes 22-1, 22-2, 22-*n* may include, but is not limited to, latency data from one or more routing nodes 22-1, 22-2, 22-*n*.

In embodiments, latency data corresponds to the measured or estimated latency between a routing node 22 and one or more compute node 20. In embodiments, the latency data comprises the measured or estimated latency between each routing node 22 and all available compute nodes 20.

Data store 216 is operable to obtain operational parameter data from the compute nodes 20-1, 20-2, **20-*n*. In embodiments, the operational parameter data obtained from the compute nodes 20-1, 20-2, 20-*n* may comprise load data for one or more compute nodes 20-1, 20-2, 20-*n***. Load data may include, but is not limited to, CPU usage, memory usage, storage I/O (e.g., disk I/O operations), network I/O amongst others.

Both data stores 214, 216 are operatively connected to the integrated module 206.

Data stores 214, 216 are shown schematically and described separately and classified by the data content stored in each case for clarity of understanding. However, it is to be understood that data stores 214, 216 need not require separate hardware and/or software and are not limited to separate units or functions. The functionality attributed to data stores 214, 216 may be combined and attributed to a single data store which handles operational parameter data from both compute nodes 20-1, 20-2, **20-*n* and routing nodes 22-1, 22-2, 22-*n***.

Application Provisioner 202 Operation

In this embodiment, the application provisioner 202 comprises a combined machine learning integrated module 206 run simultaneously in an optimization operation. An optimization operation using the application provisioner 202 is carried out at periodic intervals.

Any suitable interval period may be used. In embodiments, the interval period may be between 1 and 30 seconds. In embodiments, the interval period may be 5-15 seconds. In embodiments, the interval period may be 10 seconds.

For each iteration of an optimization operation, the application provisioner 202 and integrated module 106 generate predicted data representative of a new state for one or more applications deployed on the edge compute platform 10. In embodiments, the application provisioner 202 generates predicted data representative of a new state for all applications deployed on the edge compute platform 10.

When a virtual application instance **24-*n* is provisioned for the first time, initial compute nodes 20 to host that virtual application instance 24-*n*, and number of virtual application instances 24-*n* per compute node 20 are specified and applied. The application provisioner 206** control loop is executed periodically.

For each iteration of the execution, the application provisioner 206 utilizes the traffic and load data to generate a new application state with simultaneously optimized latency and load on the edge compute platform 10. A new optimized state is generated which includes new compute nodes 20 and number of virtual application instances **24-*n* to be provisioned per compute node 20**.

In this specific embodiment, the integrated module 206 receives the initial state (i.e., the state at the beginning of an optimization operation) as an input and produces a new state by determining the most appropriate action for the current state to achieve a maximized and/or optimal deployment configuration.

In other words, at the start of the optimization operation, the integrated module 206 receives the initial state including current compute nodes 20 that are deployed in the network 10 and latency data from the regions 22. Based on the initial state and the latency data on a part or whole of the network 10, an action is proposed by the module.

Figure 9:
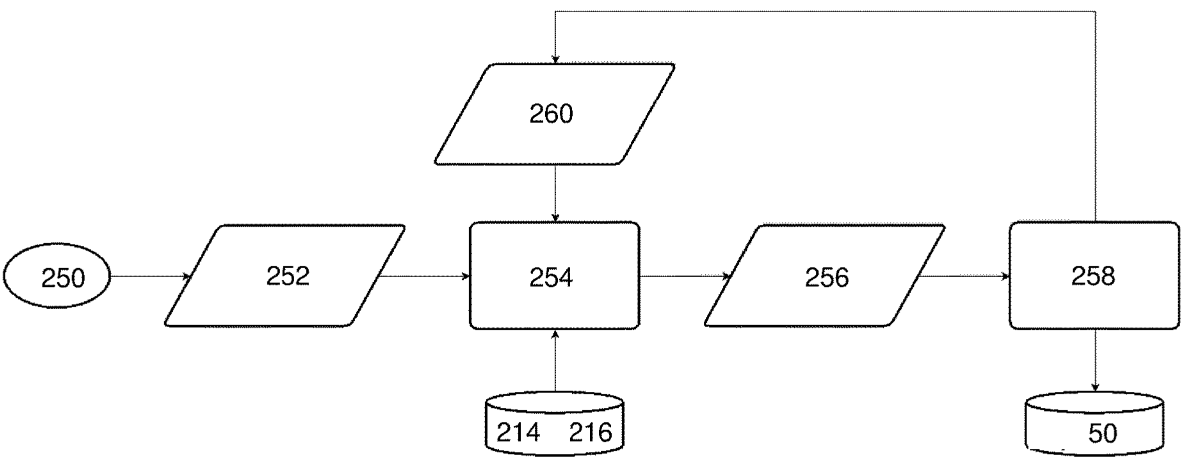
FIG. 9 is a flow chart showing the operation process of the embodiment of FIG. 8.
Figure 10:
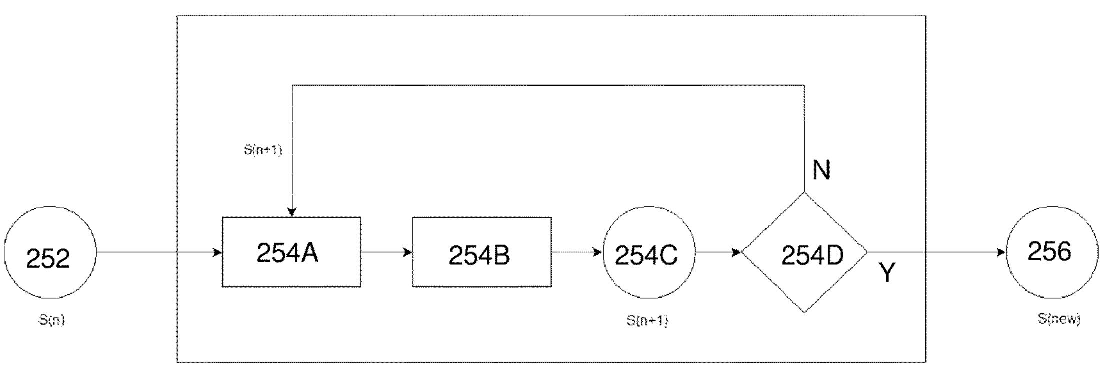
FIG. 10 is a flow chart showing an operation process for a step 254 shown in FIG. 9 for the embodiment of FIG. 8.

The steps of the methods will now be described in detail with reference to FIGS. 9 and 10. FIG. 9 shows a flow chart illustrating the operation sequence for this embodiment, and FIG. 10 shows a detailed schematic diagram of the iterative predicted data generation stage.

Method

The following method relates to the steps occurring during an update to the application state initiated by the system manager 200 and/or the application provisioner 202 and/or the integrated module 206.

The method comprises a computer-implemented method of provisioning network resources in a distributed compute network having one or more compute nodes and one or more routing nodes. The method is executed by at least one hardware processor.

Step 250: Start

At step 250 the process is started. The process may be initiated manually or automatically. If initiated automatically this may be on a periodic basis or it may be on the basis of particular criteria being met. If the initiation is carried out at periodic intervals, any suitable interval period may be used.

In embodiments, the interval period may be between 1 and 30 seconds. In embodiments, the interval period may be 5-15 seconds. In embodiments, the interval period may be 10 seconds.

Step 252: Determine Initial State

At step 252 the initial state of the application is determined. The state of the application corresponds, in embodiments, to the current virtual application deployment state within the edge compute platform 10 for that application. In other words, in embodiments, the state corresponds to the number and type of deployed virtual application instances **24-*n* of the application 24 on the edge compute platform 10 across all the active compute nodes 20 hosting those virtual application instances 24-*n***.

In embodiments, the state may include information on the compute nodes 20 which are not hosting virtual application instances **24-*n*, i.e. compute nodes 20 which are deprovisioned with respect to the application. In embodiments, the state may correspond to the overall configuration of the routing nodes 22 and compute nodes 20 on the edge compute platform 10**.

In other words, in embodiments, the current state of the application on the distributed compute network (which, in embodiments comprises the edge compute platform 10) comprises information relating to the current virtual application deployment state (i.e. number and location of virtual application instances **24-*n*) as well as configuration information on the distributed compute network itself (e.g. configuration and/or location of compute nodes 20 and routing nodes 22**).

The state may also, in certain embodiments, comprise information relating to operational parameters of the edge compute platform 10 in a current configuration. Operational parameters may comprise, in embodiments, operational data such as load data on the compute nodes 20, latency data between compute nodes 20 and routing nodes 22, or other suitable data.

The initial state determined in step 252 corresponds to the current state of the application 24 on the edge compute platform 10 at the time the message is implemented.

Step 254: Run Application Provisioner Integrated Module

At step 254, the application provisioner 202 and integrated module 206 are initiated. The process is operable to optimise global latency and compute load on the edge compute platform 10 simultaneously. The process is shown in detail in the flow chart of FIG. 10.

By global latency is meant the latency for a given application as a function of the total local latencies for each instance of the application on the edge compute platform 10. In embodiments, the global latency may comprise an average latency across the edge compute platform 10.

By "given application" is meant an application or process which is run on the edge compute platform 10 and distributed across the edge compute platform 10 in the form of a plurality of virtual application instances. It is to be understood that there is no specific limit on the number of applications that can be run on the edge compute platform 10.

However, whilst one or more applications may be run concurrently on the edge compute platform 10, each application is in practical effect independent from other applications and insulated therefrom. Thus, the present method is concerned only with a single application potentially having multiple virtual application instances on the edge compute platform 10.

In embodiments, the optimized global latency for a given application is the optimized global latency of the averaged sum of the optimized local latencies for each available routing node 22 for that application. In embodiments, the optimized local latency for each routing node 22 is the lowest latency compute node 20 to which the respective routing node 22 can send and/or receive data. In embodiments, the global latency may have an optimal value when all available compute nodes 20 are deployed.

By compute load is meant the computational burden placed on the virtual application instances by traffic to those virtual application instances. Compute load data may include, but is not limited to, CPU usage, memory usage, storage I/O (e.g., disk I/O operations) and network I/O data for the virtual application instances running on one or more compute nodes 20-1, 20-2, **20-*n***.

The optimization process in step 254 is shown in detail in FIG. 10. As noted above, at step 252 the initial state of the application is determined. The initial state of the application is the current state of the application on the edge compute platform 10 at the time the simultaneous optimization process in step 254 is initiated.

Data, including operational parameter data, relating to the current state of the application is received by the integrated module 106.

The latency optimizer 106 obtains operational parameter data for each routing node 22. In embodiments, this operational parameter data may comprise request data (e.g. number and type of requests, total request numbers) and/or packet distribution data for each available routing node 22. The operational parameter data may in embodiments comprise request data and/or packet distribution data between each available routing node 22 and each available compute node 20.

The operational parameter data may comprise the number of requests/packets received by each routing node 22. In addition, the operational parameter data may comprise, for each routing node 22, the latencies between that routing node 22 and each compute node 20 available to that routing node 22. These values are determined and/or obtained by the latency optimizer 106.

In other words, in embodiments, the data store 214 provides latency data relating to a current state of the distributed compute network. The latency data comprises measured and/or predicted local latency values for each routing node 22, the local latency values corresponding to the measured and/or predicted latency between an available routing node 22 and each available compute node 20 accessible by the routing node 22.

Data store 216 provides at step 254 operational parameter data obtained from the compute nodes 20-1, 20-2, **20-*n*. In embodiments, the operational parameter data obtained from the compute nodes 20-1, 20-2, 20-*n* may comprise load data for one or more compute nodes 20-1, 20-2, 20-*n*. Compute load data may include, but is not limited to, CPU usage, memory usage, storage I/O (e.g. disk I/O operations) and network I/O data for the virtual application instances running on one or more compute nodes 20-1, 20-2, 20-*n***.

In other words, in embodiments, data store 216 provides resource load data relating to the computational loads resulting from one or more application instances running on one or more compute nodes of the distributed compute network corresponding to the current state of the distributed compute network.

Referring to FIG. 10, at step 254A, the integrated module 206 is run. Based on the received operational parameter data, for latency, the number of requests/packets received by each routing node 22 can be determined and, for each routing node 22, the latencies to each available compute nodes 20 can be determined.

Further, based on the received operational parameter data for compute load, data such as CPU usage, memory usage, storage I/O (e.g., disk I/O operations) and network I/O data for the virtual application instances running on one or more compute nodes 20-1, 20-2, **20-*n*** may be utilized to determine load data.

Based on the operational parameter data for latency and load, a trained machine learning (ML) algorithm can determine predicted data for a new proposed predicted state of the edge compute platform 10.

The first embodiment of the system manager comprises the latency optimizer 106 which provisions or deprovisions compute nodes 20 in order to optimize the latency within one or more specified thresholds.

In contrast, this second embodiment of the system manager 200 comprises the integrated module 106 which provisions or deprovisions virtual application instances in specific compute nodes 20 in order to optimize both latency and load. The training of the ML algorithm will be discussed below.

The integrated module 106 determines a predicted proposed state by determining the most appropriate action for the current state to achieve a maximized and/or optimal deployment configuration.

The actions may be—'Provision n virtual application instances at compute node X', 'Deprovision n virtual application instances at compute node X' or 'No action', where n may take any value from 1 to k, k being the maximum number of virtual application instances that can be handled by compute node X In contrast to the first embodiment, the 'Deprovision virtual application instance at compute node X' can go to zero virtual application instances **24-*n* on that compute node 20, meaning the region is not selected for deployment of virtual application instances. Thus, selection of virtual application instances 24-*n* for deployment determines which compute nodes 20** are provisioned.

In other words, each virtual application instance **24-*n* is associated with a compute node 20. From the state data obtained in step 252, the integrated module 206 has information relating to the compute node 20 configuration on the edge compute platform 10**.

Latency determination operates substantially similarly to that of the first embodiment and will not be described in the same detail here for brevity.

When determining an action, the trained ML model of the integrated module 206 will aim to identify a virtual application instance 24-*n* on a compute node 20 which is optimal in terms of latency and/or load. As noted, by optimal compute note 20 is meant the compute node 20 in communication with the respective routing node 22 that is available at the current time and has the lowest latency.

The value of the global latency is determined, in embodiments, as follows. For each routing node 22 the number of requests and the latency of each request to each available compute node 20 is known. This information is used to determine the global latency.

The optimized global latency for a given application hosted on a given edge compute platform 10 at a given time point is achieved if all available compute nodes 20 are utilized. In other words, in this scenario, all routing nodes 22 will route data to the most optimal compute node 20 for each routing node 22. In this example, "most optimal" refers to the most optimal in terms of latency (with the lowest value of the latency being optimal).

Optimized global and local latencies are discussed above in the first embodiment and optimized global latency is calculated in accordance with equation 1).

As for the first embodiment, or more latency thresholds for the application may be defined. These thresholds may be based on any specific value(s), for example the terms of a service level agreement (SLA). In embodiments, a latency threshold may be 20% greater than the optimized global latency. In embodiments, a latency threshold may be 10% greater than the optimized global latency. In embodiments, a latency threshold may be 7.5% greater than the optimized global latency.

Alternatively or additionally, the latency thresholds may be set based on a numerical value above the optimized global latency. In embodiments, a latency threshold may be 20 ms above the optimized global latency. In embodiments, a latency threshold may be 10 ms above the optimized global latency. In embodiments, a latency threshold may be 5 ms above the optimized global latency.

Alternatively or additionally, the latency thresholds may be set based on a fixed numerical value above the optimized global latency. In embodiments, a latency threshold may be 40 ms provided this is above the optimized global latency. In embodiments, a latency threshold may be 20 ms provided this is above the optimized global latency. In embodiments, a latency threshold may be 15 ms provided this is above the optimized global latency.

In embodiments, multiple latency thresholds may be used. These may be specified in an end user SLA and may give the end user multiple options for guaranteed latency values as part of the SLA. For example, a user may pay a reduced fee in return for a higher guaranteed latency value. Therefore, in embodiments, a plurality of latency thresholds may be implemented.

In embodiments, a first latency threshold may be 20% greater than the optimized global latency. In embodiments, a second latency threshold may be 10% greater than the optimized global latency. In embodiments, a third latency threshold may be 7.5% greater than the optimized global latency, and so on.

The one or more latency thresholds define for the integrated module 206 and associated trained ML algorithm acceptable threshold level for latency within the optimization space.

However, in this embodiment, the optimization is performed simultaneously for the latency and load parameters to generate a new state of the edge compute platform 10. The new state defines virtual application instance 24-*n* deployments for the application in question. Each virtual application instance 24-*n* has an associated compute node 20 hosting that virtual application instance 24-*n*, and that compute node 20 has an associated local latency with respect to the routing node(s) 22 that the specific compute node 20 is in data communication with.

A virtual application instance 24-*n* may be added if the load on existing virtual application instances is too high. The add virtual application instance action is taken when the current number of virtual application instances 24-*n* either cannot handle the load, or the load is close to or above a predetermined maximum.

For example, in embodiments, if the resource usage of existing virtual application instances 24-*n* in a given compute node 20 is above the target range, then an action to add another virtual application instance 24-*n* to the compute node 20 will reduce the load of existing virtual application instances 24-*n* and direct the resource usage towards the target range.

If the resource usage is below the target range, then "remove virtual instance from compute node" action can be taken to increase the resource usage up to the target range, i.e., removing a virtual application instance will increase the resource usage of existing virtual application instances 24-*n* and bring the average load of the virtual application instances 24-*n* running on the compute node 20 into the target range. This will have the effect of releasing compute resources for other applications than application 24. The 'No action' action means that no change to the state is proposed.

In other words, the trained ML algorithm will attempt to minimize global latency whilst also selecting the number of virtual application instances 24-*n* needed to deploy the application whilst keeping load parameters within defined bounds.

The trained ML algorithm of the integrated module 206 may use one or more strategies to determine a new state. In embodiments, the integrated module 206 may use a "greedy" optimization strategy.

In embodiments, the integrated module 206 may choose the action to provision a virtual application instance 24-*n* associated with a compute node 20 that brings the most value to latency when deployed in a given application state. In other words, the latency optimizer module 106 will provision virtual application instances 24-*n* hosted by compute nodes 20 that have the most impact on lowering latency.

Where a virtual application instance 24-*n* is provisioned, then by definition the compute node 20 hosting that virtual application instance 24-*n* is provisioned. Concomitantly, if a virtual application instance 24-*n* is deprovisioned on a compute node 20 or no virtual application instances 24-*n* are assigned for hosting on a compute node 20, the compute node 20 is not deployed.

This is in contrast to the first embodiment where compute nodes 20 may be deployed to achieve latency targets, but then may be deprovisioned if at the auto-scaling optimization they are not needed.

By way of practical example, consider a situation where for an initial state (i.e., a new initialization), no virtual application instances 24-*n* on any compute nodes 20 have been selected or provisioned in the edge compute platform 10.

The integrated module 206 receives state information in step 252 and operational parameter data from the data stores

214, 216. If for example significant traffic is identified in a particular routing node 22 of the edge compute platform 10, the integrated module 206 will deploy one or more virtual application instances 24-*n* on a compute node 20 close (in terms of latency) to that routing node 22.

The trained machine learning algorithm will, based on the training it has received, select a virtual application instance 24-*n* associated with a suitable compute node 20 which will have the greatest impact on latency out of the available compute nodes 20. In addition, sufficient virtual application instances 24-*n* will be deployed on that compute node 20 to ensure that the compute load is within acceptable parameters.

Once an action has been proposed, the method proceeds to step 254B where the proposed action is applied to the initial state to generate a new state $S_{(n+1)}$ at step 254C.

At step 254D it is determined whether the new state meets the desired parameters for deployment of that new state. This may be based on any suitable parameter(s). In embodiments, a parameter may comprise one or more acceptable latency thresholds for the application. These may be based on any specific value(s), for example the terms of a service level agreement (SLA).

In embodiments, a latency threshold may be 20% greater than the optimized global latency. In embodiments, a latency threshold may be 10% greater than the optimized global latency. In embodiments, a latency threshold may be 7.5% greater than the optimized global latency.

In embodiments, a parameter may comprise a value of computational load and the new state must have load values within specific bounds.

If at step 254D it is determined that the new state is an optimal and/or maximized state, the method proceeds to step 256 where the new state $S_{(new)}$ is defined.

If at step 254D it is determined that the new state is not an optimal and/or maximized state, the method proceeds back to step 254A where the optimization process is repeated starting with state $S_{(n+1)}$ as an initial state. This may continue iteratively until convergence on a desired, optimal or maximized state is reached and the method proceeds to step 256 with the new state $S_{(new)}$.

Consider an example where the integrated module 206 is run in step 254A where the initial state corresponds to a state where no virtual application instances 24-*n* associated with compute nodes 20 have been deployed.

Step 254A is performed to generate an action, for example provisioning one or more virtual application instances 24-*n* on a compute node 20. The compute node 20 is then provisioned in step 254B and the resulting global latency and load parameters determined.

If latency is within the threshold value (for example, 7.5% greater than the optimized global latency in one embodiment) and load is within acceptable parameters, then the process can proceed to step 256. If the relevant criteria are not met in step 254D, a further iteration is run to generate a new state, and so on.

Step 256: Generate New State

Returning to FIG. 9, at step 256 a new state which has been optimized by the integrated module 206 is generated. The new state contains operational parameter data relating to the desired number and selection of virtual application instances 24-*n* on compute nodes 20 for deployment.

Step 258: Apply New State

These steps define a new state of virtual deployments for the application 24 in question. The new state is then applied to the edge compute platform 10 by the orchestrator 50 in step 258 which, upon receiving a request from the application provisioner 102 to change state, updates the state of the edge compute platform 10.

When the next periodic initiation of the process occurs, the new state can be sent in step 260 to the integrated module 206 in step 254 as a new initial state of the application.

Application Provisioner 202 Training

The integrated module 206 is operable, in use, to determine an optimal number of compute nodes 20 in optimal locations and the optimal number of virtual application instances 24-*n* running in each compute node 20 to support the load hitting the compute nodes 20. To do this, the integrated module 206 is trained.

The integrated module 206 comprises a trained machine learning model. In embodiments, the integrated module 206 comprises a trained machine learning model utilizing reinforcement learning.

An objective of a reinforcement learning training process is for the Machine Learning (ML) algorithm to be trained to adopt an optimal or close to optima strategy that maximizes a "reward function". A reward function, in embodiments, comprises a reinforcement signal that accumulates from rewards for actions which improve one or more parameters of a given state, and/or penalties for actions which worsen one or more parameters of the state of the training environment.

The training process in this embodiment is in principle similar to the training stages carried out in the first embodiment and may, in embodiments, be carried out in a similar manner, albeit simultaneously for each aspect, latency and load. By performing actions, the integrated module 206 is trained to simultaneously optimize load and latency.

In embodiments, the integrated module 206 is trained using reinforcement learning. The machine learning training module 210 enables the module 206 to be trained and refined based on real-world and/or simulated data from the edge compute platform 10 to optimize decision making by the module 206 for both load and latency optimization.

In embodiments, training parameters for use in the training process may include operational parameter data for the edge compute platform 10. In embodiments, operational parameter data may include the number of requests/packets hitting certain routing nodes 22. This provides information on the weightings to apply to the latency for all the requests coming from that routing node 22 towards the optimal, in terms of latency, compute node 20 to encourage actions to be taken to select the optimal compute node 20.

In addition, the training may utilize data collections that encapsulate relationships between observations of independent parameters related to the system load. These parameters may include but are not limited to: the size of incoming/outgoing traffic, process count, memory footprint, number of virtualization containers, disk I/O, network and port usage statistics, prior knowledge to application resource requirements, direct observations of resulting system load of interest (e.g., percentage of CPU utilization).

These parameters may then be used to generate synthetic data collections. In embodiments, real-world data is not required to generate these data collections. Different sequences are mathematically generated for each independent parameter of interest, and then this data can be used to produce corresponding system load values with different types of load functions.

Examples of functions that can be used to generate different sequences may comprise: a constant function requests trend; linear function requests trend; quadratic function requests trend; and polynomial requests trend.

These simulated values and simulated trends produce synthetic datasets that simulate scenarios of different shapes and sizes of traffic, levels of workload, computational budget, application resource-intensiveness, etc. This provides the load prediction training workflow with abundant and diverse scenarios to learn from and accommodate. This improves the quality of the trained algorithm without any reliance on real-world data.

Alternatively or additionally, these training parameters may be obtained from operational parameter data which is measured and/or estimated or otherwise inferred from real-world operation on the edge compute platform 10 or any other suitable network or scenario.

Alternatively or additionally, synthetic training data may be generated from real-world operations on the or another edge compute platform 10. Alternatively or additionally, synthetic training data may be obtained without real-world data and instead generating training data from computational simulations or computational models of the compute nodes 20 and routing nodes 22 of the edge compute platform 10.

Step 262: Start

Figure 11:
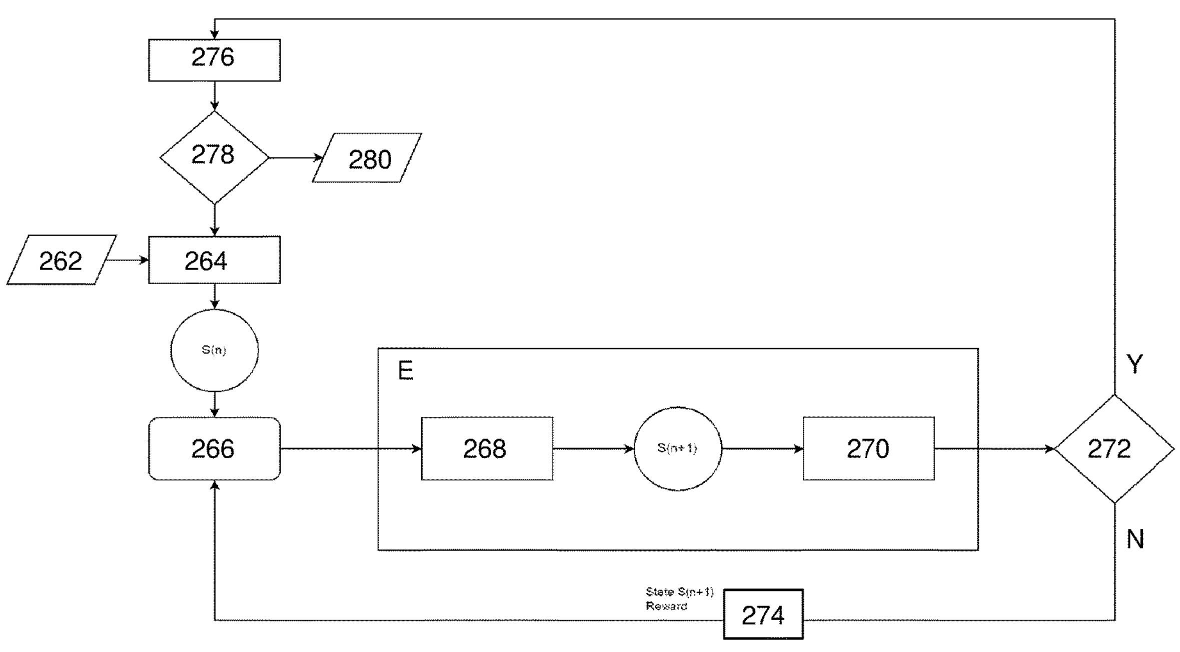
FIG. 11 is a flow chart showing an operation process for a training process for the module forming part of the embodiment of FIG. 8.

Referring now to FIG. 11, at step 262 the process is started. The process may be initiated manually or automatically. If initiated automatically this may be on a periodic basis or it may be on the basis of particular criteria being met, for example if the configuration of the edge compute platform 10 changes in use or if the selection of actions by the latency optimizer module 106 requires improvement or updating. If the initiation is carried out at periodic intervals, any suitable interval period may be used.

Step 264: Set New Scenario

The current state of the application on the edge compute platform 10 may be used as a starting state. The current state of the application corresponds, in embodiments, to the current virtual application deployment state within the edge compute platform 10. In other words, in embodiments, the state corresponds to the number and type of deployed virtual application instances 24-*n* of the application 24 on the edge compute platform 10 across all the active compute nodes 20 hosting those virtual application instances 24-*n*.

In embodiments, the state may also include information on the compute nodes 20 which are not hosting virtual application instances 24-*n*, i.e. compute nodes 20 which are deprovisioned with respect to the application. In embodiments, the state may correspond to the overall configuration of the routing nodes 22 and compute nodes 20 on the edge compute platform 10.

The state may also comprise information relating to operational parameters of the edge compute platform 10 in a current configuration. Operational parameters may comprise, in embodiments, operational data such as load data on the compute nodes 20, latency data between compute nodes 20 and routing nodes 22 or other suitable data.

At step 266 the scenario $S_{(n)}$ is provided to the training module 210 as described below.

Steps 266-278: Integrated Module Training

At step 266 the scenario $S_{(n)}$ is provided to the training module 210 and the training module 210 explores different actions in the state $S_{(n)}$ during each iteration of a given training episode.

In step 266 the training module 210 proposes an action in an action space. The action space is a simulated training environment representative of the distributed compute network in a given state defined in step 264. For each state, one or more actions are available in the action space for that state, where each action is operable to transition the distributed compute network in the training environment from the current state to a new state.

The action space for a given state in the reinforcement training environment E includes, in embodiments, the following actions—"Add n virtual application instances to compute node X", "Remove n virtual application instances to compute node X" and "No action" for each compute node 20 in the simulated scenario. A single action step may comprise one addition or removal of a virtual application instance on one compute node 20 or may comprise, in embodiments, one or more additions of virtual instances and/or one or more removals of virtual instances from a plurality of compute nodes 20.

This action is then applied to the current state in step 268. This produces a new simulated state $S_{(n+1)}$ of the edge compute platform 10 within the simulated training environment E. The success or failure of a particular action is reflected in a reinforcement learning reward or penalty calculated using a reward function at step 270.

The reward function evaluates how good the proposed action by the training module 210 is. The reward function therefore evaluates how the latency and/or load is improved or worsened by any given action taken in step 266 and applied in step 268. As noted, the reward function has a latency component and a load component in this embodiment.

In embodiments, the value of the reward function is a function of the resulting change in global latency within the simulated state resulting from the action on the state. In embodiments, an improved global latency is a lower global latency value for the application 24.

In embodiments, the value of the reward function is also a function of the resulting change in system load within the simulated state $S_{(n+1)}$ resulting from the action on the state $S_{(n)}$ determined in step 266 and applied in step 268 to produce simulated state $S_{(n+1)}$.

In embodiments, by improved system load is meant that the average load of the virtual application instances 24-*n* running on the compute node 20 is within specified target parameters. The change in system load may, in embodiments, be determined by a trained load predictor module forming part of the integrated module 206 in common with the first embodiment and invoked as described in relation to step 190 above.

Once the reward for the state $S_{(n+1)}$ has been determined, it is determined whether a termination criterion is reached at step 272. This may, in embodiments, comprise meeting a particular reward target or other criterion.

If the criterion or criteria is not met, the state $S_{(n+1)}$ and associated reward is optionally stored at step 274 and the process returns to step 26. At step 266, the training process is repeated based on state $S_{(n+1)}$ and the reward determined at step 270 and stored in step 274. This process continues for one or more iterations $S_{(n+i)}$ (where i is the $i^{th}$ iteration) until the termination criterion is met at step 272.

If the criterion is met, the episode is terminated. When the episode is terminated the trained ML model of the integrated module 206 is updated at step 276 with the improved information obtained by the iterative process of taking actions and receiving specific rewards in steps 266 to 274.

In other words, when the training process is complete the integrated module 206 can then be updated with the new training data at step 276. At step 278, it is determined whether the required performance has been reached. This may be based on any specific metric; for example, whether the integrated module 206 can configure a state of the edge compute platform 10 to meet latency demands whilst maintaining load within desired bounds.

If the required performance is met at step 278, the process ends at step 280 and the integrated module 206 can then be run to update the virtual application deployment state based on the newly trained algorithm(s) stored in the integrated module 206.

To achieve this, the integrated module 206 is invoked by the system manager 200 based on the current virtual application deployment state. The integrated module 206 proposes the best action to take for the current state to any target levels of Quality of Service and meet load demands. If the target states are met, then one or more instances of the orchestrator 50 are utilized to update the virtual application deployment state based on the new state parameters.

However, if the target latency Quality of Service is not achieved the integrated module 206 is invoked again to propose a new action or set of actions, this time with the updated state. This is repeated until the target latency Quality of Service is achieved.

If the required performance is not met at step 278, then the training process is repeated from step 264 above.

The second embodiment differs from the first embodiment in the following features.

First, the integrated module 206 is trained by performing actions starting by the initial state of virtual application instances—which is zero for all the compute nodes 20 in the initial state. If the action 'Provision n virtual application instances to compute node X' is performed in the selected compute node 20 for the first time, this action will have a significant impact on the latency part of the reward function because compute node X will be provisioned in order to handle the virtual application instances.

This is because there is the potential to reduce the latency if the selected compute node 20 is close to the traffic source. If the 'Provision n virtual application instances to compute node X' is performed for the second or more times on the same compute node 20, it will not contribute much to the latency part of the reward function thereafter but can only contribute to the load part of the reward function.

This enables greater optimization when compared to the first embodiment because the optimizations for latency and load are separated in the process flow and the rewards/penalties for various actions in the training processes are also separated. So an equivalent action performed in the latency optimizer of the first embodiment (i.e. provision compute node X) will not have any effect on the second or third time this action is performed.

In the second embodiment, the reward function is comprised of two parts—a latency part and a load part. The latency part evaluates how much the latency improves with the action. The load part of the reward function evaluates how much the action contributes to bringing the average load of the virtual application instances on the compute node 20 closer to the target load. However, the reward function is a combined reward function so the variables of latency and load are inter-dependent in the second embodiment.

If the action was performed in a compute node 20 where the average load on virtual application instances is outside of the target range, the contribution of the action will be large. If not, then there will be no contribution or it can be negative if too many virtual application instances are added or removed, bringing the target load outside of the desired range.

By performing multi-parametric training and optimization of both latency and load, improvements within the action and state spaces can be achieved, leading to efficiency improvements. However, this also attracts a computational cost. Thus, the first and second embodiments represent different solutions to address the needs of different networks.

SUMMARY

As noted above, in specific embodiments, the aim of the present invention is to reduce the latency to virtual applications as well as reducing the resources (including but not limited to, CPU, memory, disk) and energy usage of the underlying server infrastructure.

In embodiments, the present invention uses traffic data from the routing nodes 22 deployed in server regions across the globe. Traffic data provides information to obtain the traffic distribution. Traffic distribution is then used by the proposed innovation to identify the most optimal compute nodes 20 in terms of latency to deploy the application to.

By selecting the most optimal compute nodes 20 the proposed innovation ensures the latency is optimal for the clients and the users of the application. By provisioning the application to the server regions closest (in terms of latency) to the geographical points that are the most active (i.e. have the most traffic), the latency to the application is optimized.

In addition to optimizing the latency this reduces the costs of long-range data transfer as well. If the traffic in a compute node 20 drops, then the proposed innovation will deprovision the application from that compute node 20 to reduce the resource usage and with this the costs for the users. If the activity occurs in the new regions, the proposed innovation provisions the application in the most optimal region to keep the latency low.

The proposed innovation measures the load (CPU, memory, disk, network I/O usage, and other system metrics) hitting the application in a specific compute node 20. If the load of the application within the compute node 20 is too high, the application provisioner will increase the number of virtual application instances 24-*n* provisioned in the compute node 20. If the load drops below a certain point, the application provisioner 202 will reduce the number of virtual application instances 24-*n* to reduce the resource and energy usage.

In embodiments, the present invention takes into consideration traffic measured on the routing nodes for the application, latency between the routing nodes and all available compute nodes, and the load of all application instances in all regions.

In embodiments, based on these inputs, the application provisioner can optimize the latency and scale the application in the regions. This is achieved by deploying the virtual application instances as close (in terms of latency) to the routing nodes as possible and scale virtual application instances within the region appropriately so the instances can withstand the traffic hitting the region.

Compute nodes geographically closest to a routing node may not be the most optimal in terms of latency as the latency heavily depends on the network state. Therefore, latency measured between a routing node and all compute nodes available to that routing node is used for the optimization process.

Furthermore, the load information is combined with the traffic hitting the region to decide on the optimal number of virtual application instances needed to process the incoming traffic to make sure the load of the virtual application instances is kept within the desired target resources load range (CPU, memory, disk I/O, etc.) and the instances are not overloaded.

Figure 12:
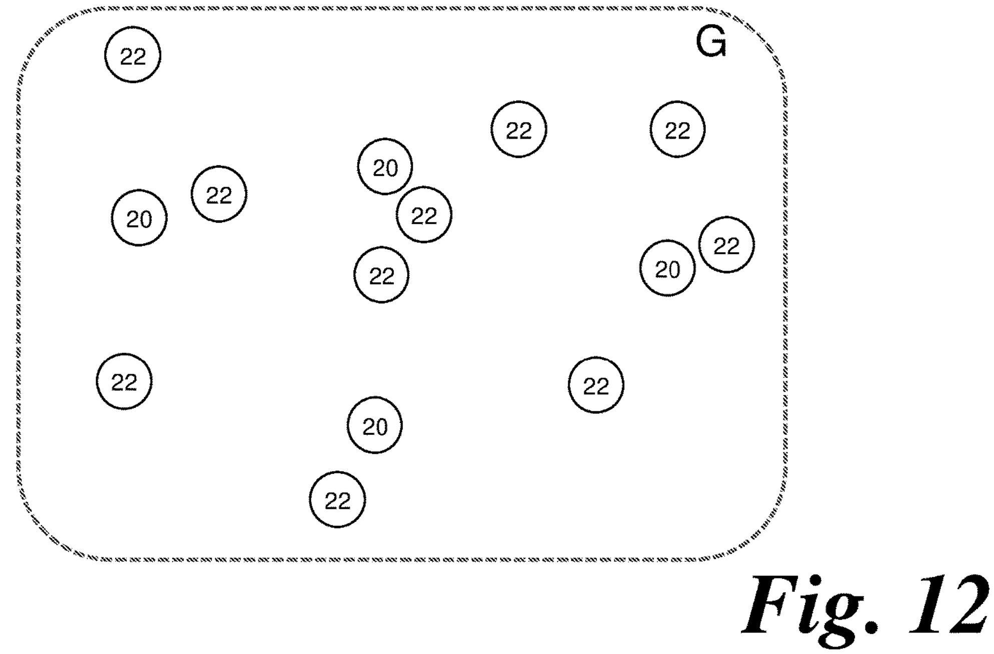
FIGS. 12 to 14 illustrate a schematic diagram of the operation of the present invention.
Figure 13:
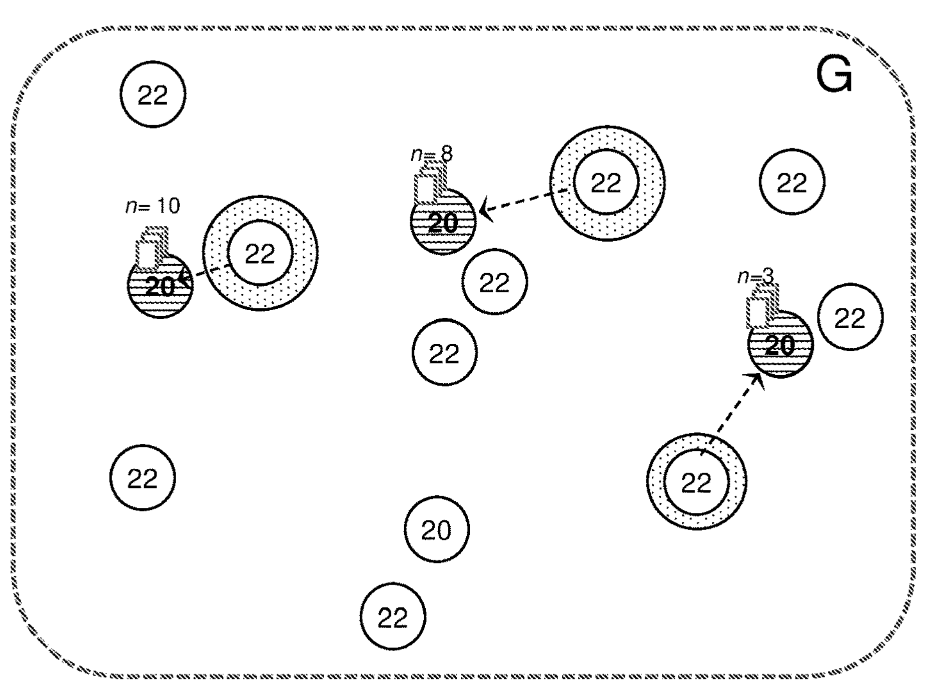
Figure 14:
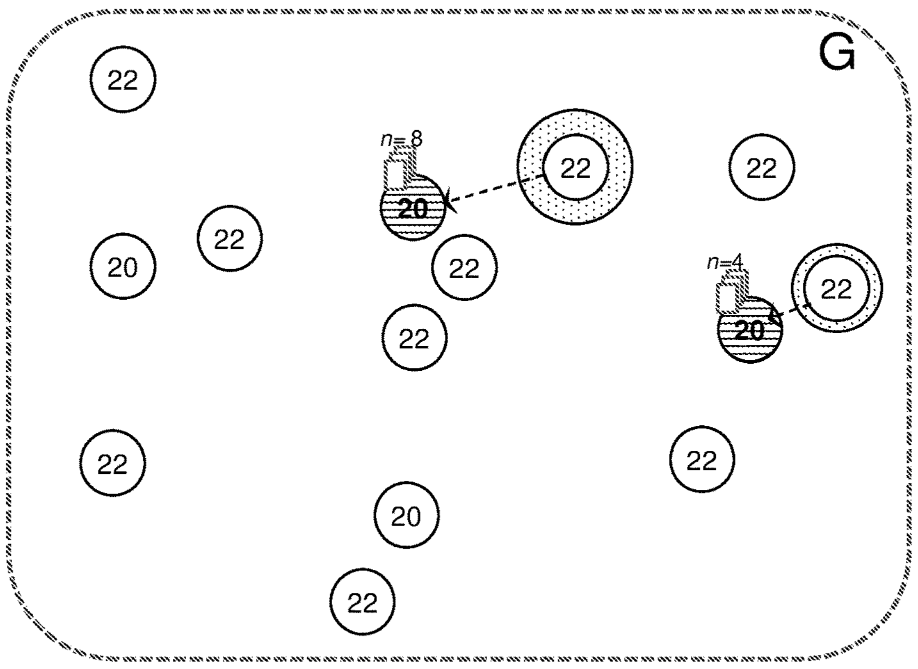

Traffic distribution examples of the invention are shown in FIGS. 12 to 14. Compute nodes 20 and routing nodes 22 are shown within a geographic region G. FIG. 12 illustrates the starting configuration of the compute nodes 20 and routing nodes 22 without data traffic or load.

FIGS. 13 and 14 show two examples of the system in action. Data traffic on the routing nodes 22 is visualized by means of a shaded concentric circle around the routing node 22 (where the larger the circle, the more data traffic is hitting the routing node 22). Selected compute nodes for deployment are shown shaded with horizontal stripes.

FIGS. 13 and 14 show how compute nodes 20 and number of virtual application instances 24-*n* change when traffic distribution and intensity changes. As shown, the number of application instances 24-*n* varies between 3 and 10 depending on the load on the respective compute node 20. As is clearly shown, the routing to compute nodes 20 is adaptive based on latency and load.

It will be appreciated by the person of skill in the art that various modifications may be made to the above-described examples without departing from the scope of the invention as defined by the appended claims.

For example, one or more portions of methods described above may be performed in a different order (or concurrently) and still achieve desirable results.

It will be understood that the term "edge compute platform" as used herein may refer to a networked system of distributed servers or clusters/collections of servers for processing application data (referred to as "compute nodes") and "routing nodes" comprising one or more physical computing devices (for example, one or more routing servers) configured to direct data traffic to or from compute nodes to deliver compute resources to a user.

It will be understood that the term "compute node" as used herein may refer to one or more physical computing devices (for example, one or more compute servers). A compute node may comprise a single server in a geographic location. A compute node may also comprise multiple physical computing devices or servers grouped in networked clusters known as a "data center". A compute node may also be referred to as a data center. A data center may comprise a number of networked server devices collectively operable to provide compute services to users of the data center. In non-limiting examples, the physical computing device(s) forming the compute node may be located in the same geographical region or specific geographical location. It is common for the server devices to be located in a single geographical location (such as a single physical data center facility) although in certain circumstances the server devices may be more widely geographically located.

It will be understood that the term "routing node" as used herein may refer to one or more physical computing devices (for example, one or more routing servers) configured to direct data traffic to or from compute nodes in a network. In embodiments, routing nodes may also be operable to monitor traffic. Routing nodes may be part of a distinct routing network, or may be part of a distributed compute network along with compute nodes.

It will be understood that if a routing network is provided as part of an edge compute platform, the routing network may comprise one or more networks such as Internet Service Provider (ISP) networks. In addition, the routing network may take any suitable form and may be owned and operated by one or more different entities from the distributed network. For example, the routing network and one or more associated routing nodes may comprise an internet-connected network operated by commercial entities such as Internet Service Providers (ISP).

It will be understood that the term "application provisioner" as used herein may refer to a software component or system module that dynamically allocates or deallocates virtual application instances on compute nodes within an edge compute platform based on system parameter values and machine learning models.

It will be understood that terms such as "operational parameters", "system parameters" and "operational characteristic data" as used herein may refer to specific measurable properties or characteristics of compute nodes and/or routing nodes and/or communication between nodes within an edge compute platform or other distributed compute network, such as processing power, processing capacity, memory usage, memory capacity, network bandwidth, latency, local latency, global latency or other operational metrics that influence the capability, performance and efficiency of the network.

It will be understood that the term "reinforcement learning" as used herein may refer to a type of machine learning model that learns to make decisions by taking actions in an environment to maximize some form of reward or minimize some form of a penalty.

It will be understood that the term "provisioning" as used herein may refer to the process of adding virtual application instances on compute nodes in a network, thereby increasing virtual application resources and adjusting the overall state of the network.

It will also be understood that the term "provisioning" as used herein may also refer to the process of adding active compute nodes to the edge compute platform for providing virtualized application resources for an application. It is to be understood that compute nodes may be present on the network and available for, but may remain deprovisioned with respect to virtual application instances of an application until selected and/or provisioned for use in running one or more virtual application instances and adjusting the overall state of the network.

It will be understood that the term "deprovisioning" as used herein may refer to the process of removing or shutting down virtual application instances on compute nodes in a network, thereby freeing up resources and adjusting the overall state of the network.

It will also be understood that the term "deprovisioning" as used herein may also refer to the process of removing compute nodes, thereby freeing up resources and adjusting the overall state of the network. If a compute node is entirely deprovisioned (i.e. has no virtual application instances of the application running thereon) then that compute node is deemed to be deprovisioned.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

All prior teachings above are hereby incorporated herein by reference. No acknowledgement of any prior published document herein should be taken to be an admission or representation that the teaching thereof was common general knowledge in Australia or elsewhere at the date thereof.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "modules", "units" or "components," it is noted that that terms are not limited to single units or functions. Moreover, functionality attributed to some of the modules or components described herein may be combined and attributed to fewer modules or components.

Further, whilst the present invention has been described with reference to specific embodiments and examples, those examples are intended to be illustrative only, and are not intended to limit the invention. It will be apparent to those of ordinary skill in the art that changes, additions or deletions may be made to the disclosed embodiments without departing from the spirit and scope of the invention.

What is claimed is:

1. A computer-implemented method of provisioning resources in a distributed compute network comprising one or more routing nodes and one or more compute nodes configured to host one or more virtual application instances of an application thereon, the method being performed by at least one hardware processor and comprising:

(a) receiving, by a system manager, resource load data relating to the computational loads resulting from one or more virtual application instances running on one or more compute nodes corresponding to a current state of the distributed compute network;

(b) determining, by the system manager, whether the values of the resource load data corresponding to the current state of the distributed compute network fall outside one or more predetermined target ranges for the resource load data and, if so determined, performing the step of:

(c) dynamically performing, utilizing a trained machine learning model, provisioning of virtual application instances and/or deprovisioning of virtual application instances on one or more compute nodes to generate a new state of the distributed computing network, wherein the trained machine learning model is trained by a reinforcement learning training method comprising (d) defining an action space for a training environment representative of the distributed compute network, the training environment having a plurality of states and, for each state, one or more available actions in the action space, each action being operable to transition the distributed compute network in the training environment from a current state to a new state, (e) selecting one or more available actions in the action space to define a new state, (f) determining a reward for the one or more selected actions based upon a predicted change in load characteristics for the distributed compute network in the training environment in moving from the current state to the new state, the predicted change in load characteristics being determined at least in part based on training data relating to the distributed compute network, wherein the training data comprising simulated load data relating to one or more parameters of one or more compute nodes, and (g) training the machine learning model using the predicted change in load characteristics and the reward values to generate an updated trained machine learning model.

2. The computer-implemented method according to claim 1, wherein the training method further comprises:

(h) generating training data comprising simulated load data relating to one or more parameters of one or more compute nodes.

3. The computer-implemented method according to claim 2, wherein step (h) comprises generating training data by generating a time-series sequence of simulated values representative of one or more parameters of one or more compute nodes.

4. The computer-implemented method according to claim 3, wherein the time-series sequence of simulated values have pre-defined ranges.

5. The computer-implemented method according to claim 4, wherein the time-series sequence of simulated values for the one or more parameters of one or more compute nodes is generated using one or more mathematical functions.

6. The computer-implemented method according to claim 5, wherein the one or more mathematical functions are selected from the group of: a constant function; a linear function; a quadratic function; and a polynomial function.

7. The computer-implemented method according to claim 1, wherein the one or more parameters are selected from one or more of: volume of requests per unit time; process count; memory footprint; number of virtualization containers; disk I/O; network and port usage; and percentage of CPU utilization for one or more servers of one or more compute nodes.

8. The computer-implemented method according to claim 1, wherein step (f) comprises utilizing a load predictor model trained on the training data to predict the change in load distribution on the distributed compute network resulting from one or more actions in step (e).

9. The computer-implemented method according to claim 8, wherein, prior to step (e), the method comprises:

(i) training the load predictor model on the training data.

10. The computer-implemented method according to claim 8, wherein the load predictor model comprises a machine learning model.

11. The computer-implemented method according to claim 1, wherein the available actions in step (e) comprise one or more of: provision one or more virtual application instances of an application on one or more compute nodes; deprovision one or more virtual application instances of an application on one or more compute nodes; and take no action.

12. The computer-implemented method according to claim 11, wherein step (f) is performed after the actions have been implemented in step (e) to define the new state.

13. The computer-implemented method according to claim 1, wherein, subsequent to step (f), the method further comprises:

(j) determining whether a reward target has been met and, if so, progressing to step (g).

14. The computer-implemented method according to claim 13, wherein, if the reward target is not met at step j, the method further comprises:

(k) iteratively repeating step (e) and step (f) until the reward target is met.

* * * * *